US011637783B2

(12) United States Patent
Arngren et al.

(10) Patent No.: US 11,637,783 B2
(45) Date of Patent: Apr. 25, 2023

(54) PROVIDING COMMUNICATION SERVICES USING SETS OF I/O USER DEVICES

(71) Applicant: Telefonaktiebolaget LM Ericsson (publ), Stockholm (SE)

(72) Inventors: Tommy Arngren, Södra Sunderbyn (SE); Hans Hannu, Luleå (SE); Peter Ökvist, Luleå (SE); Stefan Wänstedt, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 36 days.

(21) Appl. No.: 17/604,236

(22) PCT Filed: May 3, 2019

(86) PCT No.: PCT/EP2019/061417
§ 371 (c)(1),
(2) Date: Oct. 15, 2021

(87) PCT Pub. No.: WO2020/224746
PCT Pub. Date: Nov. 12, 2020

(65) Prior Publication Data
US 2022/0200922 A1 Jun. 23, 2022

(51) Int. Cl.
*H04L 47/283* (2022.01)
*H04L 65/65* (2022.01)
*G06F 13/10* (2006.01)

(52) U.S. Cl.
CPC .......... *H04L 47/283* (2013.01); *G06F 13/107* (2013.01); *H04L 65/65* (2022.05)

(58) Field of Classification Search
CPC ... H04L 47/283; H04L 47/70; H04L 65/1069; H04L 67/08; H04L 67/52; H04L 47/801;
(Continued)

(56) References Cited

U.S. PATENT DOCUMENTS 9,087,012 B1 7/2015 Hayes et al.
10,098,164 B2 10/2018 Lewis et al.
(Continued)

FOREIGN PATENT DOCUMENTS

EP 2750332 B1 8/2015
EP 1612979 B1 5/2017

OTHER PUBLICATIONS

Examination Report for Indian Application No. 202147055359 dated May 13, 2022, 8 pages.
(Continued)

*Primary Examiner* — Djenane M Bayard
(74) *Attorney, Agent, or Firm* — Sage Patent Group

(57) ABSTRACT

A user terminal emulation server maintains a database identifying network addresses, UI capabilities, and communication protocols of I/O user devices. Communication sessions are established between a user terminal emulation application and a network entity and I/O user devices proximately located to a user and provide a combined I/O user interface. Delay profiles are determined between the application and the I/O user devices. A downlink flow from the network entity is split into a plurality of downlink flow components assigned to the I/O user devices. For each of the downlink flow components, the server formats the component for transmission to the assigned I/O user device, initiates transmission of the formatted downlink flow component to the assigned I/O user device, and controls timing for when the formatted downlink flow component is transmitted to the assigned I/O user device based on the delay profile associated with the assigned I/O user device.

20 Claims, 14 Drawing Sheets

(58) Field of Classification Search
CPC ..... H04L 47/824; H04L 47/127; H04L 47/32; H04L 65/65; H04L 12/14; H04L 61/45; H04L 65/1059; H04L 65/1063; H04L 65/1073; H04L 67/59; H04L 69/24; H04L 12/4641; H04L 47/10; H04L 47/564; H04L 67/01; H04L 67/02; H04L 67/34; H04L 67/51; H04L 2101/677; H04L 43/16; H04L 47/72; H04L 47/765; H04L 47/803; H04L 47/828; H04L 63/105; H04L 63/162; H04L 65/1104; H04L 65/80; H04L 67/025; H04L 12/00; H04L 12/1403; H04L 12/1407; H04L 12/1485; H04L 61/2528; H04L 63/306; H04L 67/148; H04L 9/40; H04L 1/0028; H04L 1/1664; H04L 1/1874; H04L 12/4633; H04L 5/0053; H04L 5/001; H04L 5/0048; H04L 5/0098; H04L 5/0094; H04L 5/0051; H04L 5/0023; H04L 5/0044; H04L 5/0091; H04L 5/0055; H04L 5/0092; H04L 1/1896; H04L 1/1819; H04L 1/1812; H04L 5/0007; H04L 12/189; H04L 1/1854; H04L 1/1864; H04L 69/16; H04L 5/0032; H04L 1/0026; H04L 69/22; H04L 1/20; H04L 45/38; H04L 5/005; H04L 69/163; H04L 5/14; H04L 1/1861; H04L 47/20; H04L 69/161; H04L 69/165; H04L 1/1822; H04L 63/0272; H04L 5/0035; H04L 5/0057; H04L 69/169; H04L 1/08

See application file for complete search history.

(56) References Cited

U.S. PATENT DOCUMENTS

| | | | |
|---|---|---|---|
| 10,122,605 | B2 | 11/2018 | Kulkarni |
| 2013/0104178 | A1 | 4/2013 | Babu et al. |
| 2013/0185448 | A1 | 7/2013 | Morelli |
| 2015/0363109 | A1 | 12/2015 | Frick et al. |
| 2016/0277214 | A1 | 9/2016 | Guntaka et al. |
| 2017/0171102 | A1* | 6/2017 | Parker ..................... H04L 67/02 |
| 2019/0253917 | A1* | 8/2019 | Dao .................. H04W 28/0268 |

OTHER PUBLICATIONS

Brazilian Office Action, BR112021021159-4, dated Jan. 16, 2023, 4 pages.

International Search Report and Written Opinion of the International Searching Authority for PCT International Application No. PCT/EP2019/061417 dated Dec. 17, 2019.

* cited by examiner

PROVIDING COMMUNICATION SERVICES USING SETS OF I/O USER DEVICES

CROSS REFERENCE TO RELATED APPLICATION

This application is a 35 U.S.C. § 371 national stage application of PCT International Application No. PCT/EP2019/061417 filed on May 3, 2019, the disclosure and content of which is incorporated by reference herein in its entirety.

TECHNICAL FIELD

The present disclosure relates to a user terminal emulation server for providing communication services using sets of input and/or output (I/O) user devices, a method by a user terminal emulation server for providing communication services using sets of I/O user devices, and a computer program product for providing communication services using sets of I/O user devices.

BACKGROUND

The market for user terminals is driven by the quest to provide users with increasingly advanced communication and other operational features within the constraints of a portable handheld form factor. The development requirements for user terminal are increasingly complex as designers seek to integrate a greater variety of user interfaces and advanced operational features within the portable handheld form factor. Advancements in operational features have required more highly integrated and faster processing circuits with greater circuit densities, which becomes more difficult under constraints on costs and power consumption.

This all-inclusive feature-rich approach for user terminal development does not satisfy all of the myriad of differing desires held by consumers seeking solutions for the rapidly expanding variety of communication services. Moreover, the always-connected expectations of today's society obligates users to vigilantly keep their user terminals within reach or risk being unable to timely receive or initiate communication services.

SUMMARY

Various embodiments disclosed herein are directed to providing a centralized server based approach for emulating a user terminal using a networked set of input and/or output (I/O) user devices that are determined to be proximately located to a user and to have user interface (UI) capabilities that are combinable to provide a user with the ability to receive and/or initiate a communication service with a network entity. A user terminal emulation server can split a downlink flow into a plurality of downlink flow components, format each of the downlink flow components to be compatible with the assigned I/O user device, and control timing for when the formatted downlink flow component is transmitted to the assigned I/O user device based on a determined delay profile for the assigned I/O user device. The user terminal emulation server can also combine uplink flow components from I/O user devices into a combined uplink flow which it formats to be compatible with the network entity.

In one embodiment, a user terminal emulation server for providing communication services using sets of I/O user devices performs operations that include maintaining a database that identifies network addresses of I/O user devices, UI capabilities of the I/O user devices, and communication protocols of the I/O user devices, based on content of received registration messages. A communication request is received from a network entity for establishing a communication service between a user and the network entity. Responsive to the communication request, communication sessions are provided between a user terminal emulation application and the network entity and between the user terminal emulation application and a set of the I/O user devices that are determined to be proximately located to a location of the user and that satisfy a combined capability rule for being combinable to provide a combined I/O user interface for the user to interface with the user terminal emulation application to perform the communication service. Delay profiles are determined for the communication sessions between the user terminal emulation application and the I/O user devices in the set, where each of the delay profiles indicates a communication delay associated with communicating with a different one of the I/O user devices in the set.

A downlink flow is received from the network entity and split into a plurality of downlink flow components that are assigned to different ones of the I/O user devices in the set, where the different ones of the downlink flow components in the set having different UI characteristic that match the UI capabilities identified by the database for the different ones of the I/O user devices in the set. The operations include repeating for each of the downlink flow components: formatting the downlink flow component for transmission to the assigned I/O user device based on the communication protocol of the assigned I/O user device identified by the database; initiating transmission of the formatted downlink flow component to the assigned I/O user device; and controlling timing for when the formatted downlink flow component is transmitted to the assigned I/O user device based on the delay profile associated with communicating with the assigned I/O user device.

Some potential advantages of this and related embodiments include that a user can receive and initiate communication services without the necessity of a traditional all-inclusive feature-rich user terminal. The user terminal emulation server can adaptively combine the available UI capabilities of I/O user devices which are proximate to a user to attempt to provide a communication service. The I/O user devices can include, for example, wireless (e.g., Bluetooth, WiFi, light communication LiFi, and/or cellular) capable speakers, microphones, display devices, keyboards, other user input and/or output user interface devices, etc., which are becoming ubiquitous nearly everywhere pursuant to the Internet of Things (IoT) revolution. The user terminal emulation server may dynamically respond to an incoming communication request directed to the user or an outgoing communication request from the user by operationally communicating with available I/O user devices which are proximate to a user to form a combined user interface through which a user terminal emulation application executed by the server provide to provide user terminal functionality for a communication service. The server-based approach can provide low cost adaptable communication services to users.

The formatting operations performed by the user terminal emulation server enable the communications between the network entity and the I/O user devices to be agnostic as to any particular communication format constraints. For example, the formatting can generate pairs of real-time protocol (RTP) and Real Time Control Protocol (RTCP) flows for each downlink flow component that is split from a downlink flow and which are formatted to be compatible with assigned ones of the I/O user devices. The user terminal emulation server can control timing of transmissions to individual ones of the I/O user devices, for example, to compensate for differing communication transmission time delays between the user terminal emulation server and the individual I/O user devices and/or to compensate for differing time delays for the individual I/O user devices to process the downlink flow components for generating UI output to the user.

Other user terminal emulation servers, methods by user terminal emulation servers, and computer program products for use with user terminal emulation servers according to embodiments of the inventive subject matter will be or become apparent to one with skill in the art upon review of the following drawings and detailed description. It is intended that all such additional user terminal emulation servers, methods, and computer program products be included within this description, be within the scope of the present inventive subject matter, and be protected by the accompanying claims. Moreover, it is intended that all embodiments disclosed herein can be implemented separately or combined in any way and/or combination

BRIEF DESCRIPTION OF THE DRAWINGS

Aspects of the present disclosure are illustrated by way of example and are not limited by the accompanying drawings. In the drawings.

DETAILED DESCRIPTION

Figure 1:
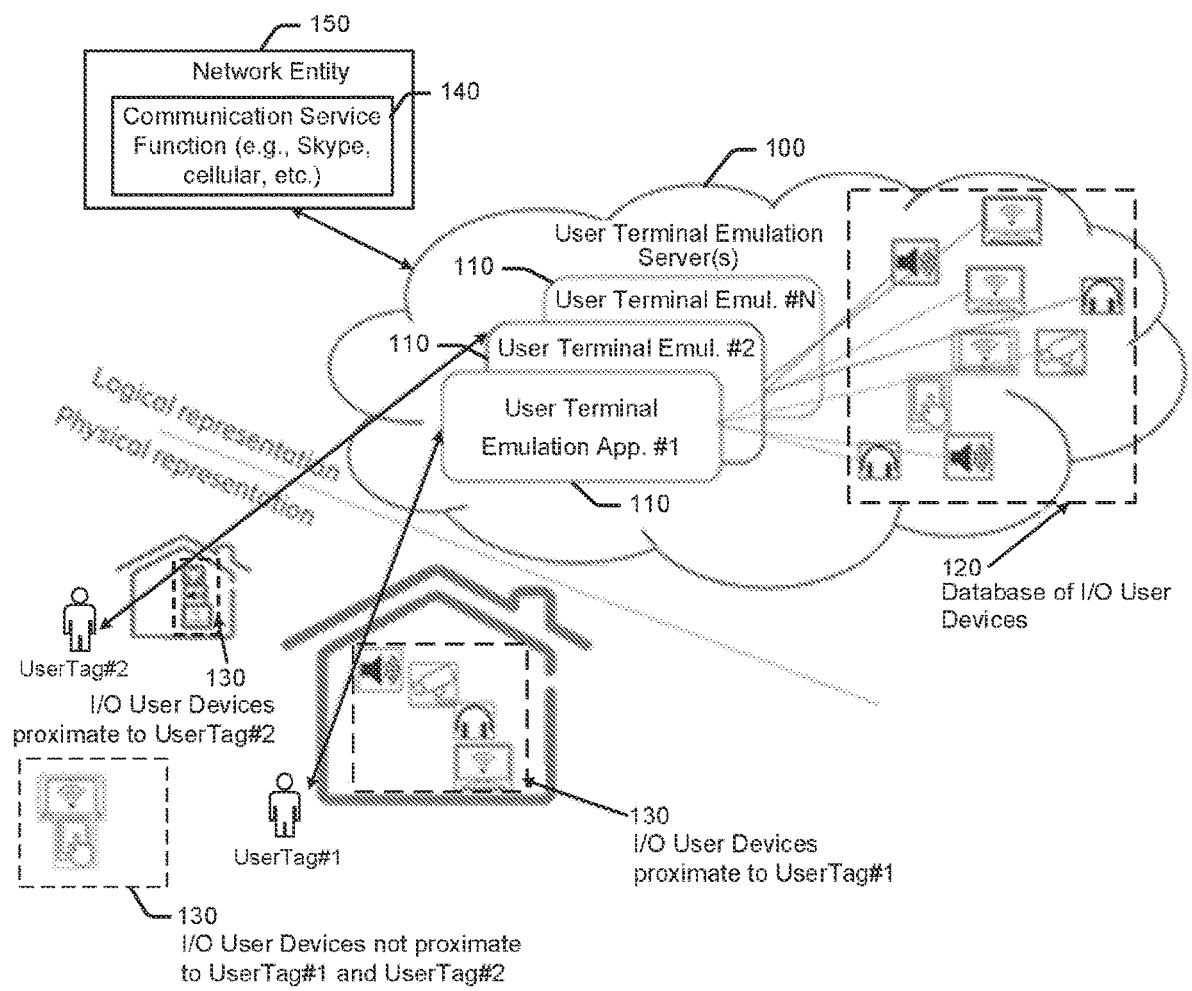
FIG. 1 illustrates a system with a user terminal emulation server that operationally integrates sets of I/O user devices that are proximately located to users to logically form virtualized user terminals providing communication services in accordance with some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

Various embodiments disclosed herein are directed to improvements in operation of a centralized server based approach for emulating a user terminal using a networked set of input and/or output (I/O) user devices that are determined to be proximately located to a user and to have user interface (UI) capabilities that are combinable to provide a combined I/O user interface for the user to interface with a user terminal emulation application of the server to perform a communication service.

Some potential advantages of these embodiments include that a user can receive and initiate communication services without the necessity of a traditional all-inclusive feature-rich user terminal, i.e., a conventional smartphone, mobile phone, tablet computer, etc. The user terminal emulation server can adaptively combine the available UI capabilities of I/O user devices that are proximate to a user to attempt to provide a communication service. The user terminal emulation server may dynamically respond to an incoming communication request directed to a user or an outgoing communication request from the user by operationally utilizing available I/O user devices which are proximate to a user to form a combined interface through which a user terminal emulation application executed by the server to provide user terminal functionality for a communication service. The server-based approach can provide low cost adaptable communication services to users.

Dynamic allocation of I/O user device capabilities whenever and wherever the I/O user devices are in the proximity of a user enables efficient and flexible use of existing hardware, such as televisions, conference phones, laptops, surveillance cameras, connected household appliances, connected cars, etc., that is capable of providing some UI functionality to user during a communication service. The user thereby has reduced or no need to carry an expensive and all-inclusive user terminal, e.g. smart phone, that includes all necessary UI capabilities, display device, keyboard, speakers, etc. The user may instead carry a hardware device which operates to identify the user, referred to as a "UserTag", over a wireless communication interface, such as a near field communication (NFC) interface, to one or more of the I/O user devices. Various embodiments disclosed herein may disrupt the traditional handset-centric mobile communication industry as the features and capabilities of what forms a user terminal are not constrained to the domain of mobile phone manufacturers. A user terminal emulation server can operate to provide a user terminal, which can also be referred to as a SoftUE or a user terminal emulation application that is run by the user terminal emulation server.

FIG. 1 illustrates a system with a user terminal emulation server 100 that operationally integrates sets of I/O user devices 130 that are proximately located to users to logically emulate user terminals providing communication services in accordance with some embodiments of the present disclosure.

Referring to FIG. 1, the user terminal emulation server 100 may be a cloud resource that is networked to the remote from the I/O user devices 130, or may be more proximately located on a shared network with the I/O user devices 130. The user terminal emulation server 100 is configured to communicate with the I/O user devices 130 to identify which, if any, are located proximately to a user for use in providing UI capabilities during a communication service.

Users may carry a hardware tag, a.k.a. UserTag, which is capable of transmitting a unique user identifier through a communications interface, such as a near-field communications interface (e.g., Bluetooth, BLE, NFC, RFID, etc., or combinations thereof), for receipt by one or more of the I/O user devices 130 which are proximately located to the user. One type of UserTag can be a simple stand-alone electronic device having limited capability for transmitting an identifier through a near-field communications interface. Another type of UserTag can be a smartphone or smartwatch having cellular connectivity that transmits a cellular identity (e.g., from a SIM card) or an application identity through a cellular interface or a near-field communications interface.

The user identifier may alternatively or additionally be operationally determined by biometrics operations performed by, e.g., one or more of the I/O user devices 130. The biometrics operations may include, without limitation, one or more of voice recognition, image/face recognition, eye recognition, fingerprint recognition, or a combination thereof. The user identity may be determined based on credential provided by the user when, e.g., logging into an application or account. The user identity may be provided by a cell phone using information from the subscription SIM and proximity of the cell phone to one or more of the I/O user devices 130 can be determined using the phone's near-field communications (NFC) capability.

A user identifier, a UserTag identifier, and a user terminal application can be logically associated with each other in a database during a user registration process or as part of another setup process. For example, during a user registration process a user may obtain an account login identifier (serving as the user identifier) that is registered in the database as being associated with a UserTag identifier for a physical UserTag that has been provided to (e.g., purchased by) the user and being associated with a user terminal application that emulates a user terminal having defined capabilities (e.g., a cell phone providing cellular and over-the-type voice-over-IP communication services).

Figure 7:
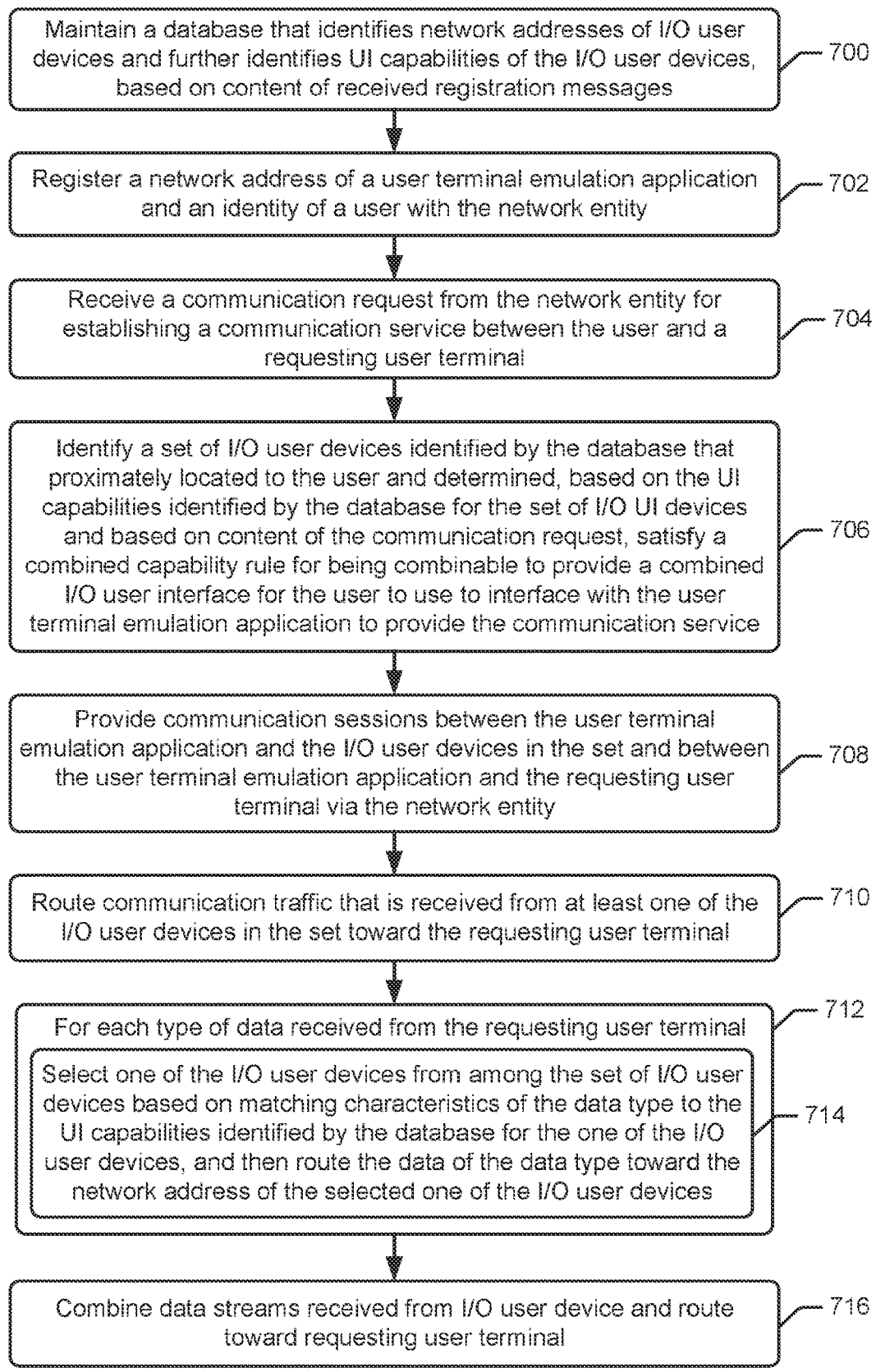
FIGS. 7 and 8 are flowcharts of operations that may be performed by a user terminal emulation server to provide communication services through a set of I/O user devices in accordance with some embodiments of the present disclosure.

Operations that can be performed by the system to provide communication services to user are described below with further reference to FIG. 7, which is a flowchart of operations by the user terminal emulation server 100. Referring to FIGS. 1 and 7, the user terminal emulation server 100 maintains 700 a database 120 that identifies network addresses of I/O user devices 130 and further identifies UI capabilities of the I/O user devices 130, based on content of received registration messages. The capabilities of the I/O user devices 130 may be logically arranged in the database 120 based on the type of UI capability provided, e.g., display device, microphone, speaker, keyboard, and may be further arranged based on a quality of service provided by the UI capability. An I/O user device 130 may communicate a registration message, containing its network address and UI capabilities, to the user terminal emulation server 100 responsive to an initial set up operation, to being connected to a new communication network, and/or responsive to another defined event for triggering generation of a registration message. The registration messages may include a geographic location of the I/O user device 130, which can be stored in the database 120. The I/O user devices 130 may communicate with the server 100 via a data network (e.g., Internet and/or private network) using a WiFi transceiver, Bluetooth transceiver, cellular transceiver, light communication transceiver (LiFi), and/or another RF or light communications transceiver.

The user terminal emulation server 100 registers 702 a network address of a user terminal emulation application 110 and an identity of a user with a network entity 150 providing communication services. The network entity 150 provides a communication service function 140 which may, for example, correspond to an over-the-top Voice Over Internet Protocol (VoIP) service, Netflix service, Facebook service, Skype service, Internet browser service, a cellular communication service, etc. The user terminal emulation application 110 is executed by the user terminal emulation server 100. A user terminal emulation application 110 may run one or more applications that are normally run by a smart phone, such as a Netflix application, Facebook application, Skype application, Internet browser application, etc.

As illustrated in FIG. 1, a different instantiation of the user terminal emulation application 110 may be hosted by the server 100 for each user who is to be provided communication services (i.e., illustrated user terminal emulation applications #1-#N corresponding to users 1-N). The user terminal emulation application 110 may perform registration of the user with the network entity 150 and setup of a communication service with a user responsive to communication requests in accordance with the operations of FIG. 7.

When the communication service function 140 of the network entity 150 is a VoIP service, the operation to register 702 the network address of the user terminal emulation application and the identity of the user with the network entity 150 can include registering the network address of the user terminal emulation application 110 and the identity of the user with a network server of a VoIP communication service provider.

When the communication service function 140 of the network entity 150 is a cellular communication service, the operation to register 702 the network address of the user terminal emulation application and the identity of the user with the network entity 150 can include registering the network address of the user terminal emulation application 110 and the identity of the user with a Home Subscriber Server (HSS) or other network node of a core network operated by a cellular communication service provider.

The user terminal emulation server 100 may receive the registration messages from the I/O user devices using the Session Initiation Protocol (SIP)/Session Description Protocol (SDP), where each of the registration messages identifies the network address and the UI capability of one of the I/O user devices. The communication request may be received from the network entity 150 using the SIP/SDP, and the operation to provide communication sessions between the user terminal emulation application 110 and each of the I/O user devices in the set, and between the user terminal emulation application 110 and the requesting user terminal may be performing using the SIP/SDP.

A registration message from an I/O user device can include, for example, an IP address and port number, MAC address, fully qualified domain name (FQDN), and/or another network address, and further include information identifying the UI capability of the I/O user device. The I/O user device may respond to becoming powered-on by communicating the registration message to the user terminal emulation server 100.

The user terminal emulation server 100 receives 704 a communication request from the network entity 150 for establishing a communication service between the user and a requesting user terminal, e.g., a cellular phone, computer with Skype application, etc. Responsive to the communication request, the user terminal emulation server 100 identifies 706 a set of I/O user devices among the I/O user devices 130 identified by the database 120 that are determined to be proximately located to a location of the user and are further determined, based on the UI capabilities identified by the database 120 for the set of I/O user devices and based on content of the communication request, to satisfy a combined capability rule for being combinable to provide a combined I/O user interface for the user to interface with the user terminal emulation application 110 to provide the communication service.

Based on determining that the set of I/O user devices satisfies the combined capability rule, the user terminal emulation server 100 provides 708 communication sessions between the user terminal emulation application 110 and the I/O user devices in the set and between the user terminal emulation application 110 and the requesting user terminal via the network entity 150. The communication request that is received 704 by the user terminal emulation application 110 may contain an indication of a minimum UI capability that must be provided to the user during the communication service, such as: speaker only; combination of speaker and microphone; display only; combination of display device, speaker, and microphone; etc. The combined capability rule which is used by the server 100 to determine whether a communication service can be provided and by which set of I/O user devices, may thereby be defined based on the minimum UI capability that is indicated by the communication request.

The user terminal emulation server 100 then routes 710 communication traffic that is received from at least one of the I/O user devices in the set toward the requesting user terminal via the network entity 150. For each data type that is received as communication traffic from the requesting user terminal, the user terminal emulation server 100 selects one of the I/O user devices from among the set of I/O user devices based on matching characteristics of the data type to the UI capabilities identified by the database 120 for the one of the I/O user devices, and then routes the data of the data type toward the network address of the selected one of the I/O user devices.

As will be explained in further detail below, the server 100 may also combine 716 data streams are received from the I/O user devices in the set, and route the combined data streams towards the requesting user terminal, e.g., via the network entity 150.

Figure 8:
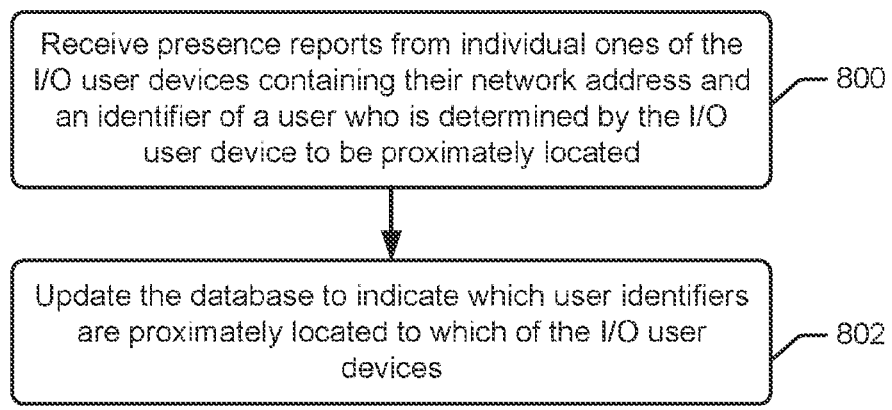

The user terminal emulation server 100 (e.g., the application 110 or an I/O user device handler described below) may be responsible for tracking which I/O user devices are proximately located to a present location of the user. FIG. 8 is a flowchart of corresponding operations. The server 100 can receive 800 presence reports from individual ones of the I/O user devices containing their network address and an identifier of a user who is determined by the I/O user device to be proximately located. For example, an I/O user device may read a hardware tag, also referred to herein as a "UserTag", through a NFC communication interface, may sense biometric information from the user, and/or may perform other operations to detect presence of a user and to identify the user. Responsive to the presence reports, the server 100 updates 802 the database 120 to indicate which user identifiers are proximately located to which of the I/O user devices.

With further reference to the example system of FIG. 1, a set of I/O user devices 130 has been determined by the instantiated user terminal emulation application #1 to be proximately located to a location of a first user carrying UserTag #1, and to further have UI capabilities that are combinable to satisfy the combined capability rule for providing a combined I/O user interface for the first user to use during a requested communication service. Application #1 responsively uses that set of I/O user devices 130 to provide a combined I/O user interface for use by the first user during a communication service via network entity 150 between the first user and another user terminal.

Similarly, another set of I/O user devices 130 has been determined by the instantiated user terminal emulation application #2 to be proximately located to a location of a second user carrying UserTag #2, and to further have UI capabilities that are combinable to satisfy the combined capability rule for providing a combined I/O user interface for the second user to use during a requested communication service. Application #2 responsively uses that set of I/O user devices 130 to provide a combined I/O user interface for use by the second user during a communication service via network entity 150 between the second user and yet another user terminal.

FIG. 1 also illustrates that another set of I/O user devices 130 is not proximately located to either UserTag #1 or UserTag #2.

As explained above, the communication request which is requesting the establishment of communication service with an identified user may be initiated by the network entity 150 using the network address of the user terminal emulation application and identity of the user which were earlier registered with the network entity 150. However, the communication request may additionally or alternatively be generated by one of the I/O user devices 130 responsive to a command received from a proximately located user. For example, a user may operate a user interface provided by one of the I/O user devices 130 to initiate a combined audio and video call with another user. The user terminal emulation server 100 (e.g., the IODH or the application 110 for that user) receives the communication request along with the identity of the user, which may be sensed via the UserTag. The application 110 performs the identifying 706, providing 708, routing 710, selecting 712, and combining 716 operations described above for FIG. 7 to set up and operate a communication service between the user and the other user via the network entity 150.

Further example systems and related operations will now be described to further illustrate how I/O user devices having different UI capabilities can be operationally combined to provide a combined UI that can be used by user to satisfy the communication requirements of a communication service.

Further illustrative operations are described regarding an example embodiment in which a speaker device is one of the I/O user devices 130 in the set capable of playing a received audio stream and a microphone device is one of the I/O user devices 130 in the set capable of sensing audio to output a microphone stream. Operations by the user terminal emulation application include updating the database 120 based on content of registration messages from the speaker device and the microphone device to identify network addresses of the speaker device and the microphone device, and to identify UI capabilities of the speaker device as having a speaker capability and the microphone device as having a microphone capability. The speaker UI capabilities may identify a number of speakers provided, sound loudness capability, and/or other operational characteristics. The microphone UI capabilities may identify a number of microphones provided, sensitivity the microphones, and/or other operational characteristics. The speaker device and the microphone device are each identified as belonging to the set of I/O user devices that are determined to be proximately located to the location of the user (e.g., UserTag #1) and are further determined, based on the UI capabilities identified by the database 120, to satisfy the combined capability rule for being combinable to provide a combined I/O UI for the user to interface with the user terminal emulation application 110 to provide the communication service. Based on determining that the speaker device and the microphone device satisfy the combined capability rule, further operations are performed to route a microphone stream received from the microphone device toward the requesting user terminal (e.g., via network entity 150). When an audio stream is received as communication traffic from the requesting user terminal the operations select the speaker device based on matching an audio characteristic of the audio stream to the speaker capability identified by the database for the speaker device, and then route the audio stream toward the network address of the speaker device.

The example embodiment may include, when a display device is one of the I/O user devices in the set capable of displaying a received video stream, the operations update the database 120 based on content of registration messages to identify network addresses of the display device, and to identify UI capabilities of the display device as having a display capability. The display UI capabilities may identify a screen display size, aspect ratio, pixel resolution, video frame rates supported, whether display device supports shared user support via split screen configuration, and/or other operational characteristics. The display device is also identified as among the set of I/O user devices that is determined to be proximately located to the location of the user and are further determined, based on the UI capabilities identified by the database 120, to satisfy the combined capability rule for being combinable to provide the combined I/O UI for the user to interface with the user terminal emulation application 110 to provide the communication service. Based on determining that the speaker device, the display device, and the microphone device satisfy the combined capability rule, further operations respond by to receipt of video stream as communication traffic from the requesting user terminal selecting the display device based on matching a video characteristic of the video stream to the display capability identified by the database 120 for the display device, and then routing the video stream toward the network address of the display device.

In the example embodiment the operations for routing the audio stream and the video stream toward the network addresses of the speaker device and the display device, respectively, may include when audio data and video data are received within a same stream from the requesting user terminal through a first communication session: separating the audio data from the video data; routing the audio data toward the network address of the speaker device through a second communication session; and routing the video data toward the network address of the display device through the second communication session or a third communication session.

The example embodiment may include, when a camera device is one of the I/O user devices in the set capable of outputting a camera stream, the operations update the database 120 based on content of a registration message to identify a network address of the camera device and to identify a UI capability of the camera device as having a camera capability. The camera UI capabilities may identify a camera pixel count, image quality, light sensitivity, and/or other operational characteristics. The camera device is further identified as a member of the set of I/O user devices that are determined to be proximately located to the location of the user and is further determined, based on the UI capability identified by the database 120, to satisfy the combined capability rule for being combinable with the other I/O user devices in the set to provide the combined I/O UI for the user to interface with the user terminal emulation application 110 to provide the communication service. Based on determining that the camera device satisfies the combined capability rule, further operations are performed to route the camera stream received from the camera device toward the requesting user terminal, e.g., via the network entity 150.

The operations for routing the microphone stream received from the microphone device and the camera stream received from the camera device toward the requesting user terminal, can include: receiving the microphone stream from the microphone device through a first communication session; receiving the camera stream from the camera device through the first communication session or a second communication session; combining the microphone stream and camera stream in a combined stream; and routing the combined stream toward the requesting user terminal through a third communication session, e.g., via the network entity 150.

The example embodiment may include, when a keyboard device is one of the I/O user devices in the set capable of outputting key selection data responsive to key selections by a user among keys of the keyboard device, the operations can update the database 120 based on content of a registration message to identify a network address of the keyboard device and to identify a UI capability of the keyboard device as having a keyboard capability. The keyboard device capabilities may identify a key count, indication of whether the keyboard is a physical keyboard or a touch sensitive input device, and/or other keyboard capabilities. The keyboard device is further identified as a member of the set of I/O user devices that are determined to be proximately located to the location of the user and is further determined, based on the UI capability identified by the database 120, to satisfy the combined capability rule for being combinable with the other I/O user devices in the set to provide the combined I/O UI for the user to interface with the user terminal emulation application 110 to provide the communication service. Based on determining that the keyboard device satisfies the combined capability rule, further operations are performed to identify commands formed by the key selection data received from the keyboard and to perform operations that have been predefined as being triggered based on receipt of the identified commands.

The operations for routing the key selection data received from the keyboard device and microphone stream received from the microphone device, may include: receiving the key selection data from the keyboard device through a first communication session receiving the microphone stream from the microphone device through the first communication session or a second communication session; combining the key selection data and the microphone stream in a combined stream; and routing the combined stream toward the requesting user terminal through a third communication session, e.g., via the network entity 150.

Although various operations have been described in the context of the communication service being successfully set up when the requested user is determined to be proximately located to a set of I/O user devices that satisfy the combined capability rule for the communication service, this will not occur when a sufficient set of I/O user devices is not determined in that manner. The corresponding operations that can be performed by the user terminal emulation application 110 when a communication service cannot be set up are explained below. In this example, the user terminal emulation application 110 receives another communication request from the network entity 150 for establishing another communication service between another user and another requesting user terminal. Responsive to the another communication request, the operations perform a determination of whether another set of I/O user devices among the I/O user devices identified by the database 120 are determined to be proximately located to a location of the another user and available for use for the another communication service and are further determined, based on the UI capabilities identified by the database 120 for the another set of I/O user devices, to satisfy the combined capability rule for being combinable to provide a combined I/O UI for the another user to interface with another user terminal emulation application to provide the another communication service. Based on determining that no other set of I/O user devices is determined to satisfy the combined capability rule and be proximately located to the location of the another user, the operations communicate a message to the network entity 150 indicating that the another communication service cannot be established. In this manner, the network entity 150 is informed that request a communication service cannot be set up at this time with the identified user.

Figure 2:
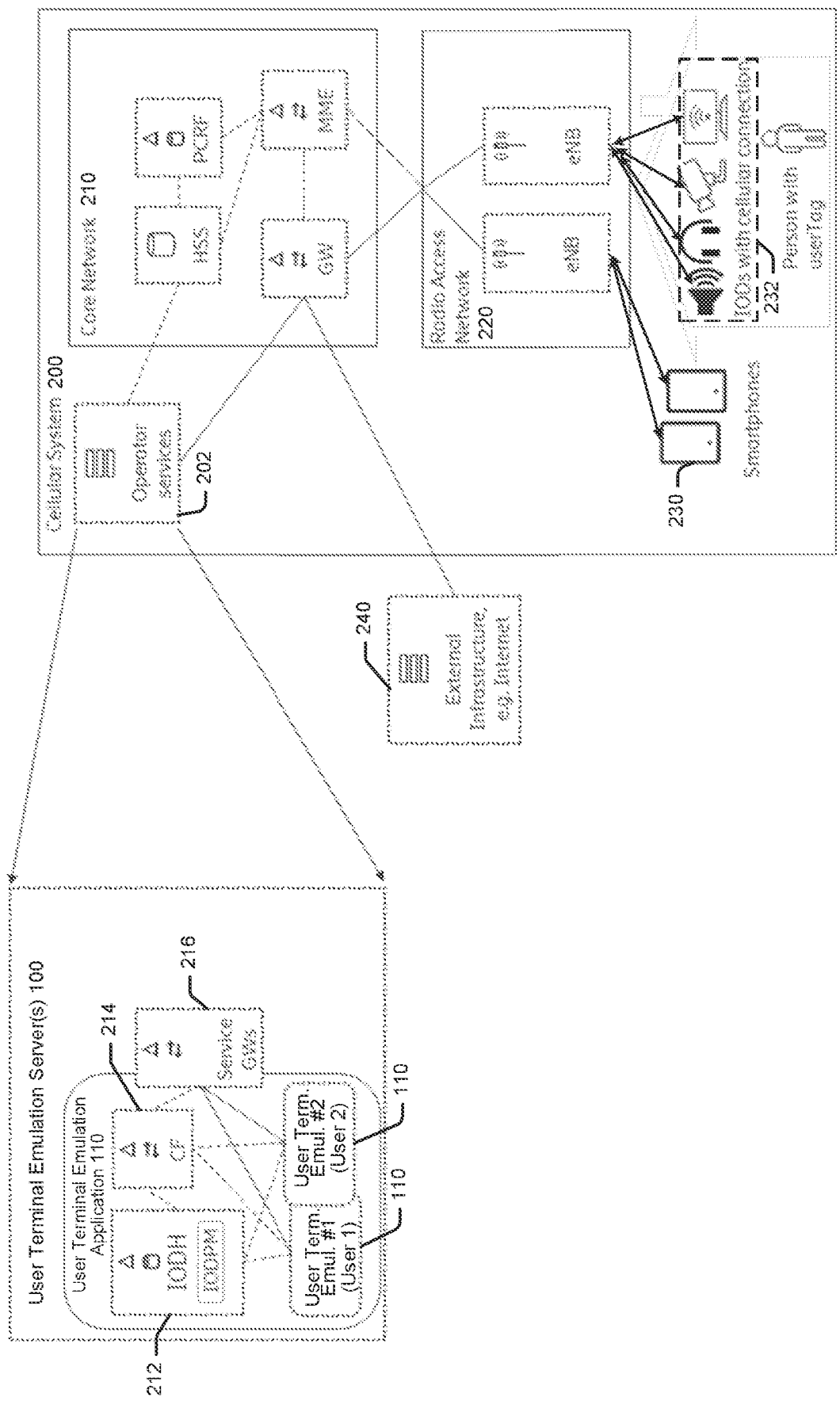
FIG. 2 is a block diagram illustrating the user terminal emulation server communicating with various elements of a cellular system to provide communication services in accordance with some embodiments of the present disclosure.

FIG. 2 is a block diagram illustrating the user terminal emulation server 100 as an element of an operator service node 202 within a cellular system 200. Referring to FIG. 2, the communication service function of the network entity 140 (FIG. 1) may be provided by the operator service node 202 or may be reached through external infrastructure 240, e.g., the Internet. The server 100 may, for example, be implemented in the radio access network 220 to provide edge computing with faster responsiveness or may be implemented within another node of the cellular system 200. The user terminal emulation server 100 can include an I/O user device handler (IODH) 212, a control function (CF) 214, the instantiated user terminal emulation applications 110, and a service gateway (GW) 216. A user terminal emulation application 110 may run one or more applications that are normally run by a smart phone, such as a Netflix application, Facebook application, Skype application, Internet browser application, etc.

The IODH 212 may perform operations to manage the I/O user devices, such as to handle maintenance (700 in FIG. 7) of the database 120 and/or perform registration (702 in FIG. 7) of the user terminal emulation applications 110. For example, the IODH 212 may operate to register with a Skype service server the IP address of a Skype application, which is run by or interfaced to the user terminal emulation application 110, and the user's Skype name. The CF 214 may be responsible for assigning an IP address to each user terminal emulation application 110. The IP address to be assigned by the CF 214 may be received from the core network 210 functionality such as a PDN-GW. The service GW 216 may interconnect the user terminal emulation server 100 to a PSTN network, packet data network gateway of a 3GPP (3rd Generation Partnership Project) system, etc. The cellular system 200 can include a Core Network 210 having a Home Subscriber Server (HSS), a Policy and Charging Roles Function (PCRF), gateway (GW) and Mobility Management Entity (MME) providing control signaling related to mobile terminal mobility and security for the radio access. The HSS contains subscriber-related information and provides support functionality for user authentication and user access to the system. The PCRF enables QoS control per data flow and radio bearer, by setting QoS rules for each data flow, based on operator set policies and subscriber information. The GW can include a Serving GW (S-GW) and a Packet Data Network GW (PDN-GW), where the S-GW interconnects the core network 210 with the radio access network 220 and routes incoming and outgoing packets for the I/O user devices 232 and/or 130 and the user terminals 230. The PDN-GW interconnects the core network 210 with external infrastructure 240, such as the Internet, and allocates IP-addresses and performs policy control and charging.

Some I/O user devices 232 having cellular communication capability can communicate via, e.g., eNBs or other radio access nodes of a Radio Access Network 220 with the operator service node 202 via the core network 210. In the system of FIG. 2, the user terminal emulation server 100 may handle set up of a communication service between a selected set of the I/O user devices are proximate to a user and a remote user terminal 230 (e.g., smart phone) via the cellular system 200.

Figure 3:
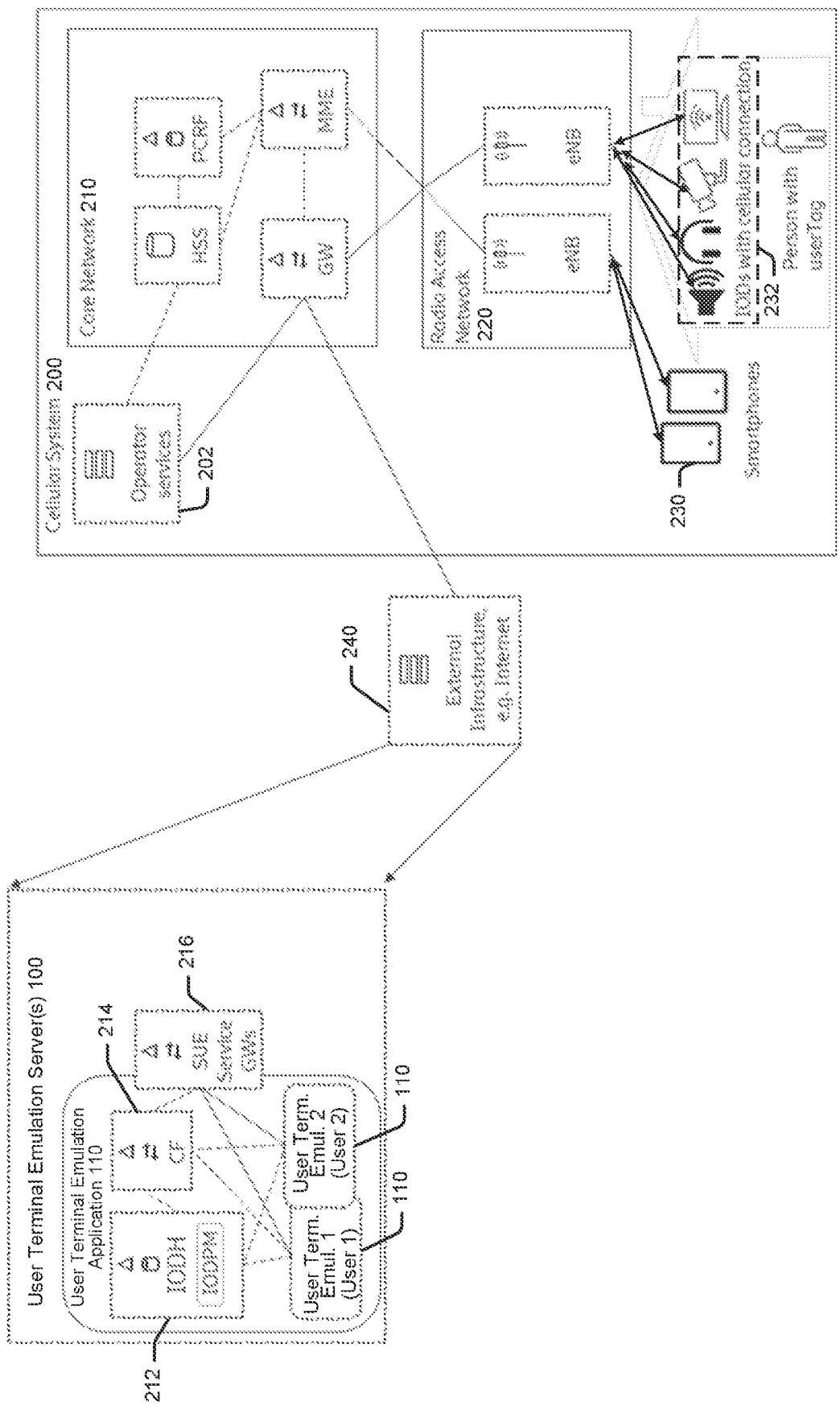
FIG. 3 is a block diagram illustrating the user terminal emulation server communicating in a different manner with various elements of a cellular system to provide communication services in accordance with some other embodiments of the present disclosure.

FIG. 3 is a block diagram illustrating the user terminal emulation server 100 communicating in a different manner with various elements of a cellular system 200, which may operate as the network entity 140 (FIG. 1), to provide communication services in accordance with some embodiments of the present disclosure. The system of FIG. 3 differs from the system of FIG. 2 by the user terminal emulation server 100 being an Internet service within external infrastructure 240 outside of the cellular system 200. In the system of FIG. 3, the CF 214 may determine the IP address to be assigned to different ones of the user terminal emulation applications 110 based on signaling from the Internet service within the external infrastructure 240.

The above and other operations will now be described in further detail in the context of three different example "use cases": 1) incoming call scenario; 2) outgoing call scenario; and 3) share of I/O user devices scenario (sharing of physical resources and/or capabilities).

Use Case 1: Incoming Call Scenario

This use case involves a user, with a UserTag or other way of being identified, being proximately located to I/O user devices 130 having different UI capabilities when an incoming call is received by the user terminal emulation server. Although operations are explained below in the context of identifying a user through a physical UserTag carried by the user, these operations are not limited thereto and may be used with any other way of identifying a user, such as by sensing biometric information that identifies the user.

A user terminal emulation application 110 may be instantiated or otherwise activated responsive by an incoming call (service, session) targeting the UserTag. The user terminal emulation application 110 can identify subscriptions associated with the UserTag (i.e. the physical user) and preferred methods of communication (e.g., audio not video, audio and video, etc.) that have been specified by the user, and determines the UI capabilities of the I/O user devices that will be needed to satisfy the UI capabilities which may be specified for the incoming communication session. The user terminal emulation application 110 may ask the IODH to identify which I/O user devices 130 are proximately located to the UserTag, and may further ask the IODH to determine or may determine itself whether the identified I/O user devices 130 are combinable to satisfy the UI capabilities specified by the incoming communication session. The user terminal emulation application 110 and/or the IODH may receive an ACK or NACK back on whether a sufficient set of I/O user devices 130 can be used to provide the communication service. If ACK, then the IODH also sets the state of the I/O user devices 130 in the set to in-use to avoid another user terminal emulation application 110 attempting to utilize the same I/O user devices 130 as which are presently in use. In case of NACK, the user terminal emulation application 110 and/or the IODH can take different actions to setup a reduced UI capability communication service with the user depending on user settings, e.g. only allow sound-based communications instead of a combination of sound and video responsive to when no display device is presently available for use. An example of no display device being available may occur when the only display device that is proximately located to the user is presently being used by another user to receive information from another user terminal emulation application during an ongoing communication service or when no display device is proximately located to the user.

Figure 4:
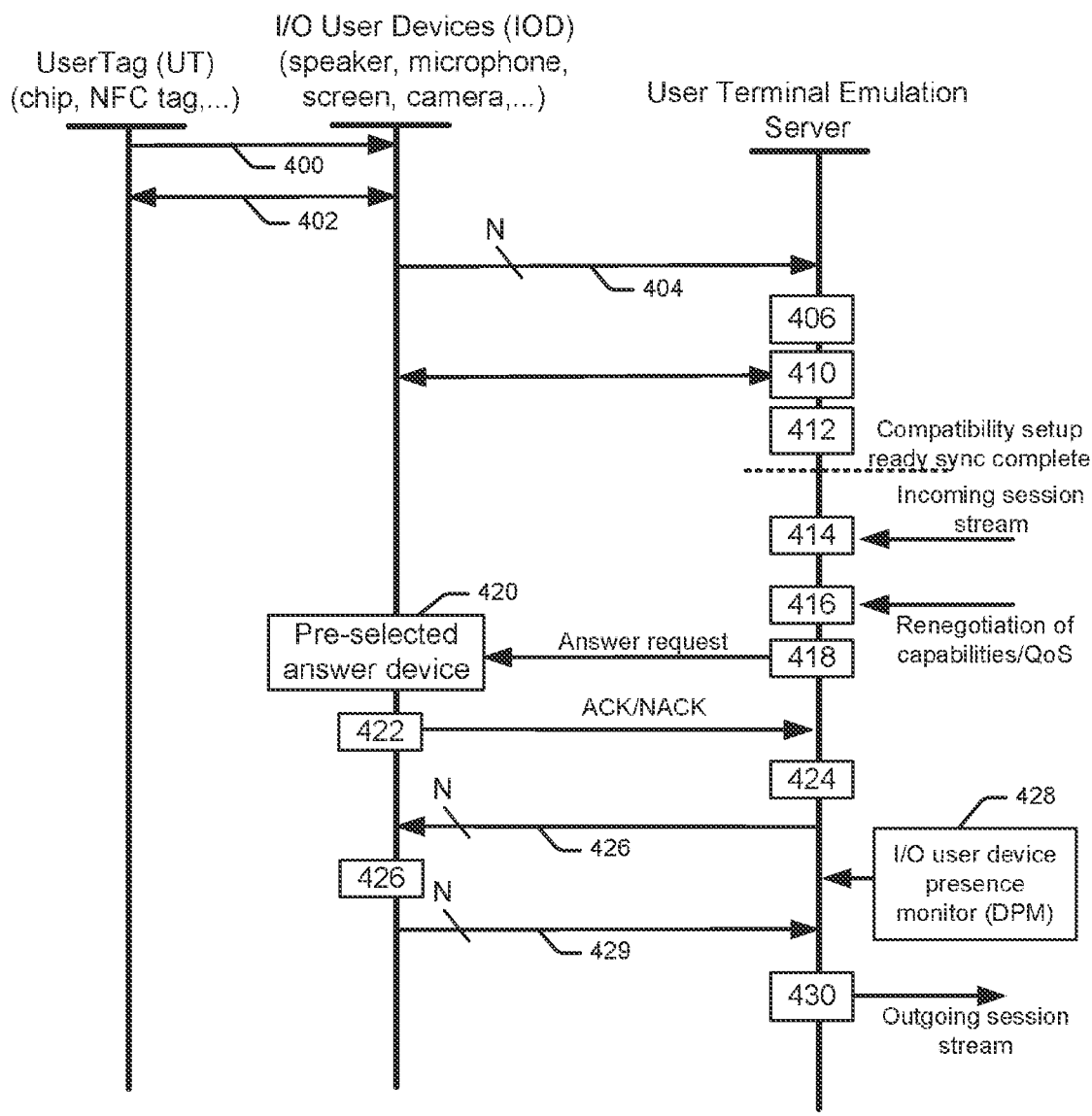
FIGS. 4-6 are combined flowcharts of operations and related data flows between UserTags, I/O user devices, and the user terminal emulation server in accordance with some embodiments of the present disclosure.

FIG. 4 is a combined flowchart of operations and related data flows between UserTags, I/O user devices, and the user terminal emulation server in accordance with some embodiments of the present disclosure. Referring to FIG. 4, a UserTag enters a room and signals 400 its presence to any proximately located and capable I/O user device in the room using a discovery beacon signal. Alternatively, one or more of the I/O user devices determines presence of the UserTag by polling 402, such as by periodically transmitting discover beacon signals that trigger responsive signaling by the UserTag. The I/O user devices that receive signaling indicated presence of the UserTag report 404 to the IODH in the user terminal emulation server along with a network address of the I/O user device (e.g., IP address, port number, MAC address, FQDN, etc.). The user terminal emulation application corresponding to the specific user (i.e., the UserTag) is updated 406 with respect to the detected user's presence. The IODH may operate to receive the notifications from the I/O user devices proximately located to the UserTag. Further UI capability discovery (synchronization) communications 410 are performed between the user terminal emulation server and the I/O user devices. The I/O user devices are associated to the user in the database, along with associated indications subscriptions, combinable UI capabilities provided by the set of I/O user devices which are proximately located to the UserTag. One or more of the I/O user devices may be selected for default call reception ACK/NACK. By operation 412 the user via the UserTag is now known to be reachable within the system through an identified set of I/O user devices with identified UI capabilities (e.g., speakers yes/no, display yes/no, microphone yes/no, keyboard yes/no, etc.), thereby creating a logical virtualized user terminal through which the user may be provided in a communication service. The user may initiate a communication service through a touchscreen, voice command sensed by a microphone, performing a defined gesture observable by a camera, and/or other input provided to one of the proximately located I/O user devices.

In operation 414, an incoming session (e.g., video call) from a requesting user terminal which is directed to the user (UserTag) arrives at the user terminal emulation server for the user carrying the UserTag. In operation 416 the combinable UI capabilities of the available I/O user devices is compared to the UI requirements of the incoming session. When the UI requirements of the incoming session are not satisfied by the combinable UI capabilities of the I/O user devices, the user terminal emulation server may renegotiate 416 the required UI capabilities (e.g., QoS) of the incoming session. In contrast, when the UI requirements of the incoming session are satisfied by the combinable UI capabilities of the I/O user devices the user terminal emulation server prompts, via one or more of the available I/O user devices (e.g., a pre-selected answer device), the user carrying the UserTag to provide a session request answer (ACK/NACK). The user responds through the pre-selected answer device 420 to accept (ACK) or reject (NACK) the incoming session, to provide signaling 422 to the user terminal emulation server. When an ACK is received, operations 424 route an audio stream from the requesting user terminal to one of the I/O user devices in the set that has a speaker capability via one or more sessions 426, and routes a video stream from the requesting user terminal to another one of the I/O user devices in the set that has a display capability via one or more sessions 426. A data stream that is received from one of I/O user devices in the set through a one or more sessions 429 is routed 430 toward the requesting user terminal. When two or more data streams are received through one or more sessions 429 from the I/O user devices, they can be combined into a combined data stream that is routed 430 toward the requesting user terminal.

The user terminal emulation server may perform operations 428 to continuously monitor presence of the I/O user devices to determine when one or more of I/O user devices is no longer proximately located to the user such that it can no longer be included as part of the combined UI be provided during the ongoing communication session. The user terminal emulation server may substitute the UI capability of another I/O user device to the set being used by the user for the ongoing communication session responsive to a previous member of the set no longer having required presence.

Use Case 2, Outgoing Call

This use case involves a user, with a UserTag, being proximately located to I/O user devices 130 having different UI capabilities when an outgoing call (communication session) is received by the user terminal emulation server. The I/O user devices 130 are associated to the identified user via the user terminal emulation server 100 which handles all communications sessions for the user while the associated I/O user devices 130 are managed by an IODH.

A user terminal emulation application 110 may be instantiated or otherwise activated responsive by an outgoing call being requested by a user carrying the UserTag. The user may initiate an outgoing call through a touchscreen, voice command sensed by a microphone, performing a defined gesture observable by a camera, and/or other input provided to one of the proximately located I/O user devices.

The user terminal emulation application 110 can identify subscriptions associated with the UserTag (i.e. the physical user) and preferred methods of communication (e.g., audio not video, audio and video, etc.) that have been specified by the user, and determines the UI capabilities of the I/O user devices that will be needed to satisfy the UI capabilities which may be specified for the outgoing call. The user terminal emulation application 110 may ask the IODH to identify which I/O user devices 130 are proximately located to the UserTag, and may further ask the IODH to determine or may determine itself whether the identified I/O user devices 130 are combinable to satisfy the UI capabilities specified by the outgoing call. The user terminal emulation application 110 and/or the IODH may receive an ACK or NACK back on whether a sufficient set of I/O user devices 130 can be used to provide the communication service. If ACK, then the IODH also sets the state of the I/O user devices 130 in the set to in-use to avoid another user terminal emulation application 110 attempting to utilize the same I/O user devices 130 as which are presently in use. In case of NACK, the user terminal emulation application 110 and/or the IODH can take different actions to setup a reduced UI capability communication service with the user depending on user settings, e.g. only allow sound instead of the preferred sound and video responsive to when no display device is presently available for use (e.g., when presently used by another user terminal emulation application 110 or when none is proximately located to the UserTag).

Figure 5:
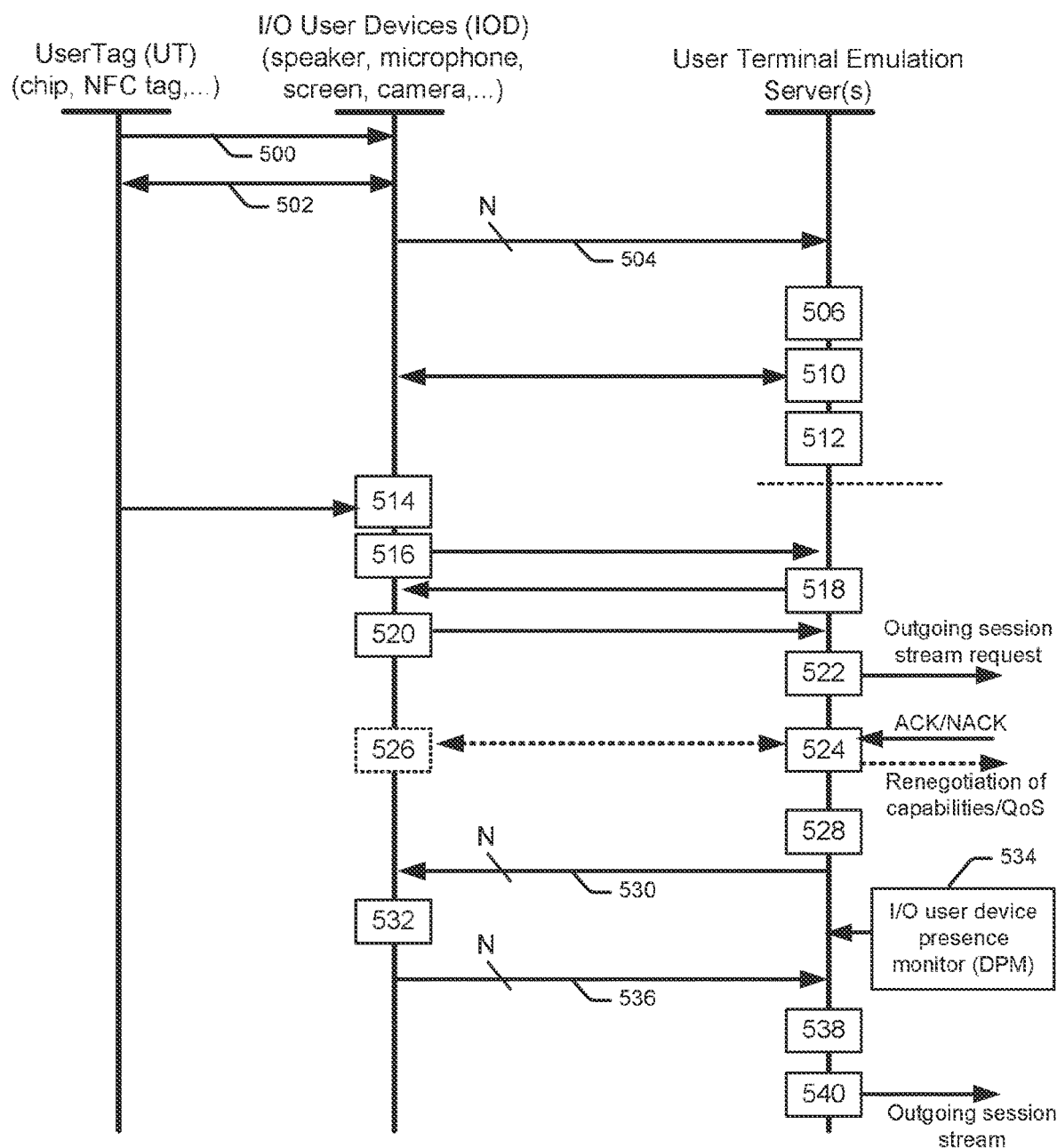

FIG. 5 is a combined flowchart of operations for an outgoing call and related data flows between UserTags, I/O user devices, and the user terminal emulation server in accordance with some embodiments of the present disclosure. Referring to FIG. 5, a UserTag enters a room and signals 500 its presence to any proximately located and capable I/O user device in the room using a discovery beacon signal. Alternatively, one or more of the I/O user devices determines presence of the UserTag by polling 502, such as by periodically transmitting discover beacon signals that trigger responsive signaling by the UserTag. The I/O user devices that receive signaling indicated presence of the UserTag report 504 to the IODH in the user terminal emulation server along with a network address of the I/O user device (e.g., IP address, port number, MAC address, FQDN, etc.). The user terminal emulation application corresponding to the specific user (i.e., the UserTag) is updated 506 with respect to the detected user's presence.

The IODH may operate to receive the notifications from the I/O user devices proximately located to the UserTag. Further UI capability discovery (synchronization) communications 510 are performed between the user terminal emulation server and the I/O user devices. The I/O user devices are associated to the user in the database, along with associated indications subscriptions, combinable UI capabilities provided by the set of I/O user devices which are proximately located to the UserTag. One or more of the I/O user devices may be selected for default call reception ACK/NACK. By operation 512 the user via the UserTag is now known to be reachable within the system through an identified set of I/O user devices with identified UI capabilities (e.g., speakers yes/no, display yes/no, microphone yes/no, keyboard yes/no, etc.), thereby creating a logical virtualized user terminal through which the user may be provided in a communication service. The user may initiate a communication service through a touchscreen, voice command sensed by a microphone, performing a defined gesture observable by a camera, and/or other input provided to one of the proximately located I/O user devices.

In operation 514, a user carrying the UserTag uses the UI of one of the I/O user devices to trigger 514 an outgoing call (e.g., video call), which triggers signaling 516 of the outgoing call to the user terminal emulation server. In operation 518 the IODH queries the user (e.g., displays a message, generates a sound, etc.) through one of the I/O user devices proximately located to the user to request the user to select among available types of communication methods that can be presently used for the outgoing call. One of the I/O user devices provides responsive signaling 520 to the IODH indicating the user's selected type of communication method for the outgoing call. In operation 522 the user terminal emulation server communicates an outgoing session stream request to the network entity 150, where the request may include an identifier of the calling user, identifier of the user terminal of the called user, and a quality of service for the communication session. In operation 522, the user terminal emulation server receives a communication session acceptance (ACK) or denial (NACK) from the network entity 150. When the communication session is denied, the user terminal emulation server may attempt to renegotiate 524 the requested communication session such as at a lower quality of service.

When the communication session is accepted (ACK), for each data type that is received 528 as communication traffic from the requesting user terminal, the user terminal emulation server selects one of the I/O user devices from among the set of I/O user devices based on matching characteristics of the data type to the UI capabilities identified by the database for the one of the I/O user devices, and then routes 530 the data of the data type toward the network address of the selected one of the I/O user devices. The data originating ones of the I/O user devices transmit 532 data stream through one or more sessions 536 to the user terminal emulation server, which may combine 538 the data streams into a combined data stream that is routed 540 toward the called user terminals via the network entity 150.

The user terminal emulation server may continuously monitor 534 presence of the I/O user devices to determine when one or more of I/O user devices is no longer proximately located to the user such that it can no longer be included as part of the combined UI be provided during the ongoing communication session. The user terminal emulation server may substitute the UI capability of another I/O user device to the set being used by the user for the ongoing communication session responsive to a previous member of the set no longer having required presence.

Use Case 3, Users Sharing I/O User Devices (Physical Resources, UI Capabilities)

The third use case is directed to a scenario where two or more users are located in a physical area having a number of I/O user devices with combined UI capabilities that are insufficient to satisfy the UI requirements needed to support time overlapping communication sessions without sharing of some of the I/O user devices by the two users. In this case, both users' ID entities, i.e. UserTags will be detected in the proximity of some I/O user devices which the IODH then associates to the users' respective user terminal emulation applications 110.

Figure 6:
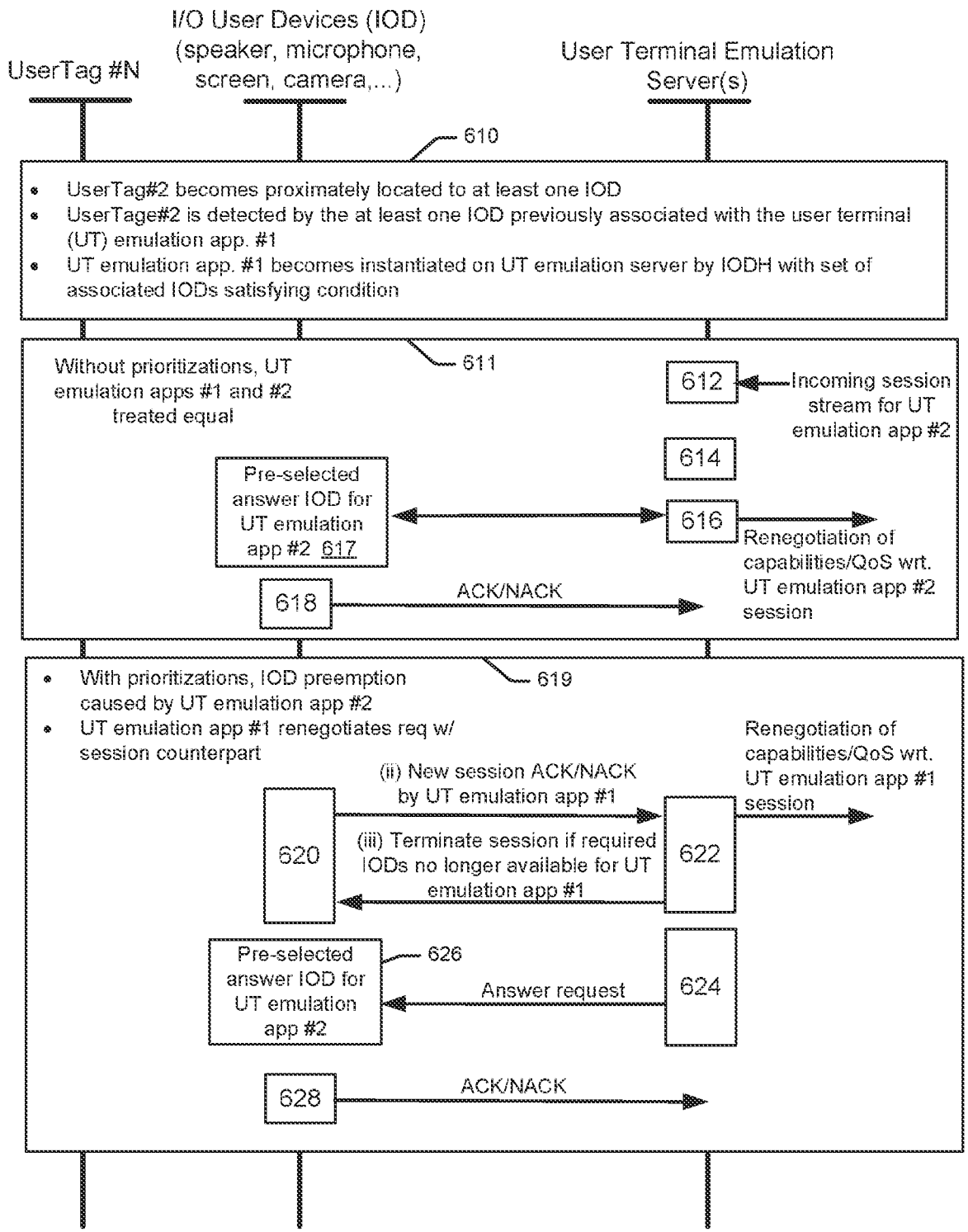

In the illustration of FIG. 6, user terminal emulation application #1 is already handling an ongoing communication session in which some of the associated I/O user devices are allocated and in use by a first user corresponding to UserTag #1; this means the example starts after block 430 in FIG. 4. At that point in time, another second user carrying UserTag #2 enters the physical area.

In block 610 the UserTag #2 becomes proximately located to at least one of the I/O user devices being presently utilized by user terminal emulation application #1. The at least one of the I/O user devices detects UserTag #2. The user terminal emulation application #2 is responsibly instantiated on the user terminal emulation server 100 by the IODH.

In block 612, a request for a new communication session is received which is intended for the user terminal emulation application #2. In block 614 the IODH considers priorities among the user terminal immolation applications have been instantiated. The IODH compares subscriptions of currently hosted (ongoing) user terminal emulation application #1 sessions to those of the new incoming request for a communication session towards the user terminal emulation application #2.

If a prioritization is not identified, the user terminal emulation applications are treated equally so that available I/O user devices with their UI capabilities are allocated on a first-come-first-served manner In contrast, if a prioritization is identified, the IODH operates to: assign a priority to certain I/O user devices for the user terminal emulation application having the highest priority according to defined QoS/capability prioritization rules; with certain UI capabilities present at certain types of I/O user devices, some UI capabilities are operationally shared between the first and second users (e.g., a sufficiently large display screen can be split in half with the halves respectively assigned to the first and second users).

In the present scenario, the user terminal emulation applications #1 and #2 are treated equally without prioritization, which applies to all operations within reference block 611.

In block 616 the IODH assesses the request to capabilities of the second user and user terminal emulation application #2 (considering prioritization's established in the previous step, if any). If the incoming request is not supported (e.g., there are no available or insufficient available I/O user devices determined (via query 617 to I/O user devices) to satisfy the required UI capabilities) by the user terminal emulation application #2 irrespective of any priorities, the IODH may operate to negotiate UI capabilities/QoS with the network entity which sent the session request for the second user. In contrast, if the incoming request is supported by the UI capabilities provided by the user device emulation application #2 for the requested communication session, as determined by the user terminal emulation application #2 querying 618 the available I/O user devices, then an ACK is communicated to the network entity 150.

If the incoming communication request can be supported by the user terminal emulation application #2 when granted some priority for use of one or more of the I/O user devices being presently used by the user terminal emulation application #1, the operations of block 619 can be performed to preempt or cause sharing of the one or more of the I/O user devices that are presently being used by the user terminal emulation application #1. The IODH and/or the user terminal emulation application #1 may then renegotiate 622 with the network entity 150 the required UI capabilities of the communication session of the user terminal emulation application #1 for the first user. The user terminal emulation application #1 may receive a session ACK/NACK generated 620 by the one or more of the preempted or shared I/O user devices with the user terminal emulation application #2 indicating what UI capabilities are available for use by the user terminal emulation application #1, and may responsively terminate the existing communication session if the required UI capability provided by the I/O user devices is no longer sufficient for use by the user terminal emulation application #1 for the communication session.

In block 624, the user terminal emulation application #2 queries the second user through a preselected one of the I/O user devices for whether the requested communication session is accepted. The preselected one of I/O user devices may display 626 a prompt querying the second user for an answer, which is provided 628 as an ACK/NACK to the user terminal emulation application #2. When the second user accepts the communication session (ACK), a communication service is established between the second user and a remote user terminal through the user terminal emulation application #2 and the network entity 150.

An I/O user device presence monitor may operate as a function of the IODH to monitor (continuously, periodically, or responsive to occurrence of a defined event) an ongoing communication session to ensure that all UI capabilities provided by the set of I/O user devices remains proximately located and operationally available to the user.

Exchange of messages between the different system entities can be carried out using the Session Initiation Protocol (SIP) with the Session Description Protocol (SDP) with possible some minor changes regarding the current supported methods in the protocols and media formats. Using SIP/SDP may be advantageous as the connections between the I/O user devices and user terminal emulation applications can be a SIP session which may set up in a manner similar to that between two VoIP clients.

More generally, the operations performed by the user terminal emulation server can include receiving another communication request from the network entity for establishing another communication service between another user and another requesting user terminal. Responsive to the another communication request, the operations determine whether another set of I/O user devices among the I/O user devices identified by the database are determined to be proximately located to a location of the another user and available for use for the another communication service and are further determined, based on the UI capabilities identified by the database for the another set of I/O user devices, to satisfy the combined capability rule for being combinable to provide a combined I/O UI for the another user to interface with another user terminal emulation application to provide the another communication service. Based on determining that no other set of I/O user devices is determined to satisfy the combined capability rule, available for use by the another communication service, and proximately located to the location of the another user, the operations responsively configure one of the I/O user devices in the set of I/O user devices that is proximately located to the another user but is currently being used by the user, to operate to provide a shared UI that is used by the user while the communication service is continuing to be provided to the user and that is further used by the another user while the another communication service is provided to the another user.

In one example, information that is directed to the user can be routed for display in one half of a screen of the display device, and information that is directed to the other user can be routed for display in the other half of the screen of the display device. In another example, a keyboard can be shared by two users who identify themselves via the keyboard (e.g., by typing a user ID, scanning the UserTag, biometric scan, etc.) at the time they are entering information, so that the server can selectively route the keyboard entries to the correct one of the two user terminal emulation applications.

Use Case 4, Mobility Handling

In this context, I/O user devices and/or a UserTag can be moving such that over time the set of I/O user devices that are proximately located to the UserTag changes. Moreover, such changes may be caused by one or more of I/O user devices becoming non-operational (e.g., loss of power) or when the radio air interface there between becomes obstructed or is subjected to excessive radio interference. The IODH can be configured to dynamically determine which of the I/O user devices remains available for association with the UserTag.

In one embodiment, mobility aspects are monitored by the I/O user device presence monitor (IODPM) located in the IODH, as illustrated in block 428 in FIG. 4 and block 534 in FIG. 5. When the IODPM discovers that a current user terminal emulation application (i.e. implicitly some of the I/O user devices it utilizes) no longer has access to a sufficient UI capability through the set of I/O user devices, e.g., which may result in violating a QoS contract for the present communication session, the IODPM can trigger re-negotiation of the UI capability requirements for the communication session through the network entity 150 and possibly with the remote user terminal.

Operational Problems with Real Time Protocol Flows

Some transmission protocols like Real Time Protocol (RTP) require an out-of-band method for synchronizing media streams. In RTP's case, each media stream has its own timestamp using an independent clock rate and per-stream randomized starting value.

A Real Time Control Protocol (RTCP) Sender Report (SR) is needed for each stream to synchronize streams. The necessary RTCP packets might be lost (since RTP/RTCP does not guarantee delivery) or not sent until at least several seconds after the stream has begun. Many software clients do not send RTCP at all or send non-compliant data.

Audio to Video Synchronization is commonly corrected and maintained with an audio synchronizer. Television industry standards organizations have established acceptable amounts of audio and video timing error and suggested practices related to maintaining acceptable timing.

For television applications, the Advanced Television Systems Committee recommends that audio should lead video by no more than 15 ms and audio should lag video by no more than 45 ms. However, the ITU performed strictly controlled tests with expert viewers and found that the threshold for detectability is −125 ms to +45 ms. For film, acceptable lip sync is no more than 22 ms in either direction.

The RTP clocks media using origination timestamps on an arbitrary timeline. A real-time clock such as one delivered by the Network Time Protocol and described in the Session Description Protocol associated with the media may be used to synchronize media. A server may then be used to for final synchronization to remove any residual offset.

The Sender Report (SR) is sent periodically by the active senders in a conference to report transmission and reception statistics for all RTP packets sent during the interval. The sender report includes an absolute timestamp, which is the number of seconds elapsed since midnight on Jan. 1, 1900. The absolute timestamp allows the receiver to synchronize RTP messages. It is particularly important when both audio and video are transmitted simultaneously, because audio and video streams use independent relative timestamps.

Existing standardized in industry approaches do not provide sufficient operational functionality for use in a cloud-based software-defined smartphone or other I/O user devices, to split and/or combine media content streams to and from each unique individual physical I/O user device, and to adapt the split or combined streams to different communication services need for the set of I/O user devices providing a user communication service.

A particularly important metric is the lag between voice and video, and this lag (and its jitter) should be kept at a minimum.

For practical purposes I/O user devices should be sufficiently simple and only hold basic protocol conversion (media stream translation) capabilities; hence, it is preferable that any content re-processing or translation is performed in the cloud, but with constraints of timely delivery to receiving nodes (i.e. the I/O user devices), or in the opposite direction, that individual streams from logically joined but physically separated I/O user devices are coherently combined and delivered upstream to receiving nodes (i.e., the network entity).

Controlling Timing and Format of Flows

Some further embodiments of the present disclosure are directed to formatting downlink flow components of a downlink flow that has been split for transmission to a set of I/O user devices based on the various communication protocols of those I/O user devices. These embodiments also control timing for when the formatted downlink flow components are separately transmitted to the I/O user devices based on delay profiles each of which indicate a communication delay associated with communicating with a different one of the I/O user devices in the set. Other related embodiments are directed to corresponding operations that are performed for combining uplink flows from I/O user devices. The uplink flow operations can include receiving uplink flow components from the I/O user devices in a set, combining the uplink flow components into a combined uplink flow including by formatting the uplink flow components for transmission to the network entity while possibly also performing time alignment, and initiating transmission of the combined uplink flow to the network entity. These and related embodiments fully described below with reference to FIGS. 1 and 9-15.

Example Timing and Format Control Operations in the Context of FIG. 1

Example timing and format control operations will now be described in the context of FIG. 1. Referring again to FIG. 1, a real-time session can be created between the user terminal emulation applications 110, which is processed by the user terminal emulation server 100, and each of the I/O user devices 130. The real-time session can be setup using, e.g., SIP. Data that is to be transferred between the user terminal emulation server 100 and an I/O user device 130 can be sent by the RTP protocol suit.

The data exchanged between the user terminal emulation server 100 and an I/O user device 130 can be treated as real-time data, although the original data between the user terminal emulation application 110 and its peer, e.g. the network entity 150 hosting a streaming client and a streaming server, have a different characteristic, e.g. streaming video. Hence, the user terminal emulation server 100 is configured to perform a data reformatting ("formatting") functionality that takes one type of received application data from the network entity 150 and processes it to a data format that is compatible with what the I/O user device 130 can use to convey the information via its UI capability to the end-user ("user"). A similar procedure can be performed with data received from the I/O user devices 130 and intended to the network entity 150.

Hence, in the direction from the network entity 150 to a I/O user device 130, the user terminal emulation server 100 (running an instance of the user terminal emulation application 110) receives the data, decodes the data and reformats the data to the format that is compatible with the targeted I/O user device(s). Reformatting of the data can include packaging the data into a data format that the I/O user device 130 operationally understands, such as by adding a header to the data when forming an application layer packet for the I/O user device 130. The newly created application layer protocol packet is sent to the I/O user device 130. The I/O user device 130 receive the packet, processes the packet header and performs appropriate action(s) to convey the information of the data in the packet to the user through the UI of the I/O user device 130 (e.g., display device, speaker device, tactile feedback device, etc.).

For example, when the emulation server 100 is performing an on-demand streaming application 110, the emulation server 100 can split on-demand video streaming data into multiple downlink flow components which it reformats to be compatible with requirements of the I/O user devices 130 in the set that is providing the user interface to a user, and controls relative timing of when the downlink flow components are transmitted to individual ones of the I/O user devices 130 based on the associated delay profiles for those I/O user devices 130. Example operations for determining and using delay profiles to control timing of transmissions will be described in further detail below in the context of subsequent figures.

In the direction from an I/O user device 130 to the network entity 150, such as when a user takes an action by talking into a microphone during a real-time conversation, the I/O user device processes the user input (e.g., creates digitized encoded voice) and creates a series of data units that are buffered in an output buffer. The I/O user device 130 takes a data unit from the buffer and creates an application layer packet, the application layer packet is then sent to the associated emulation application 110 processed by the emulation server 100. The emulation server 100 receives the application layer packet, formats the data unit to a type of data unit that can be operationally used by the network entity 150. The emulation server 100 packages the data unit into an application layer packet and sends it onwards to the network entity 150.

When the format of the first data unit and the second data unit is of the same type, and hence the first and second package format is also of the same type, formatting that takes place in the emulation server 100 may only be a change of some or all package header fields of the application layer packet.

In the reverse direction from the network entity 150 to a set of I/O user devices, where several packet streams from the network entity 150 together need to be provided to the user using the combined user interface capabilities of a set of I/O user devices 130. For example, a real-time conversational video service can have one audio stream and one video stream, the streams need to be conveyed to the user in a time synchronized way. To avoid inter-stream synchronization problems, such as when the user would observe lip-synchronization time offsets, the emulation server 100 can provide time synchronization between when the related audio and video streams are transmitted to the respective I/O user devices in the set. The RTP protocol suit provides part of the synchronization for inter-stream by having each RTP stream accompanied by a Real Time Control Protocol (RTCP) stream that carries both the RTP timestamp and the network time protocol (NTP) timestamp.

Another example of a data formatting operation by the emulation server 100 is where the data unit from the network entity 150 contains audio information intended for a stereo, e.g., 5:1 system, a set of five speaker device type I/O user devices 130 are selected and the formatting operation receives as input one data unit and it spits and reformats into 5 data units that are directed to the 5 different receiving speaker devices. Then in a further aspect, the speaker device type I/O user devices 130 may notify the emulation server 100 (i.e., the IODH 212 of FIG. 2) of their respective positions in a room, in relation to the associated UserTag, etc., enabling for the emulation server 100 (IODH 212) to pre-process the audio stream so that the correct audio channel component is transmitted to the appropriate speaker device with respect to the speaker devices' and UserTags' relative positions.

Further Operations for Controlling Downlink Flow Timing and Formatting

Figure 9:
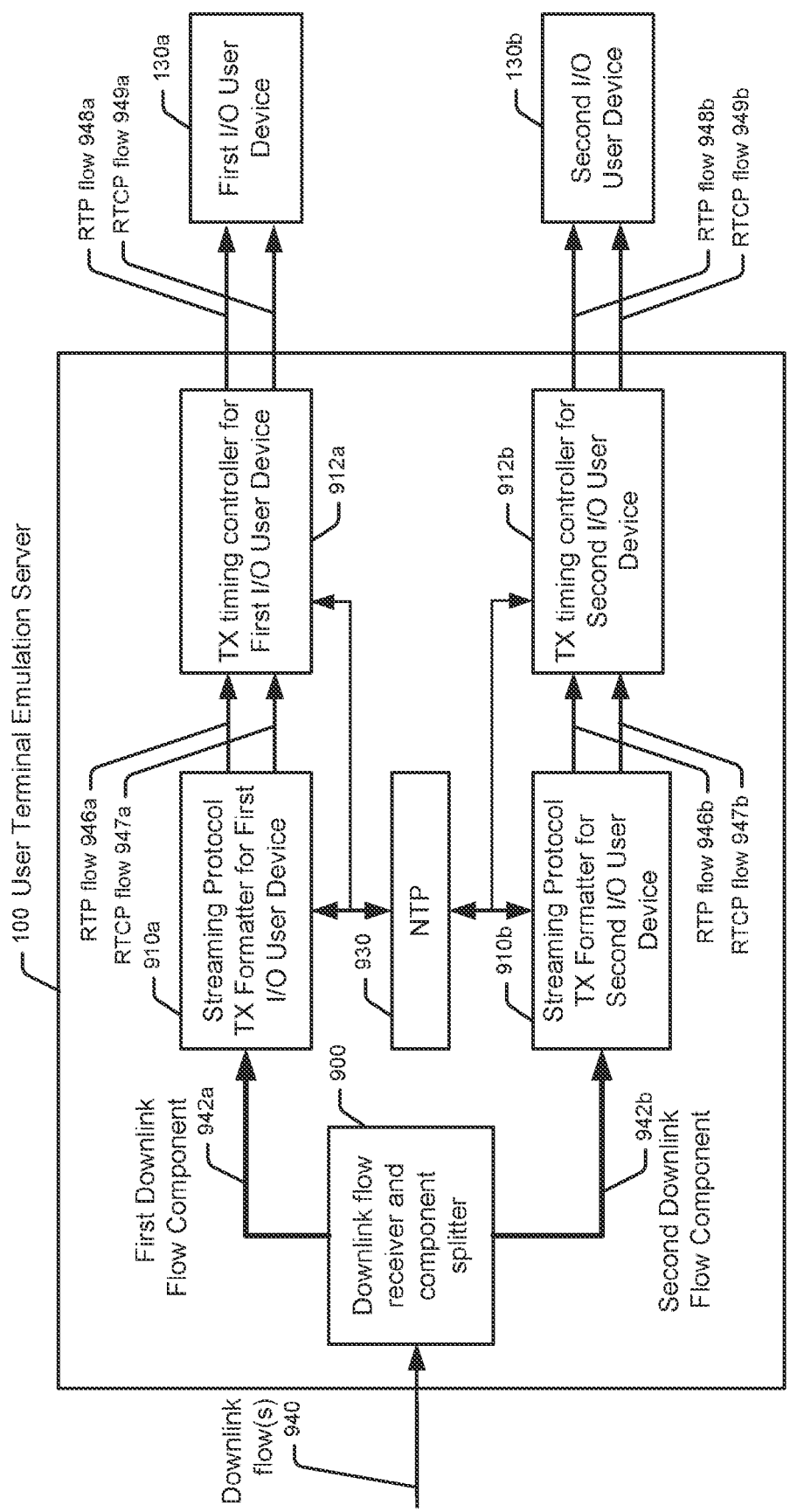
FIG. 9 is a block diagram of downlink flow functional components of a user terminal emulation server that are configured to operate in accordance with some embodiments of the present disclosure.
Figure 11:
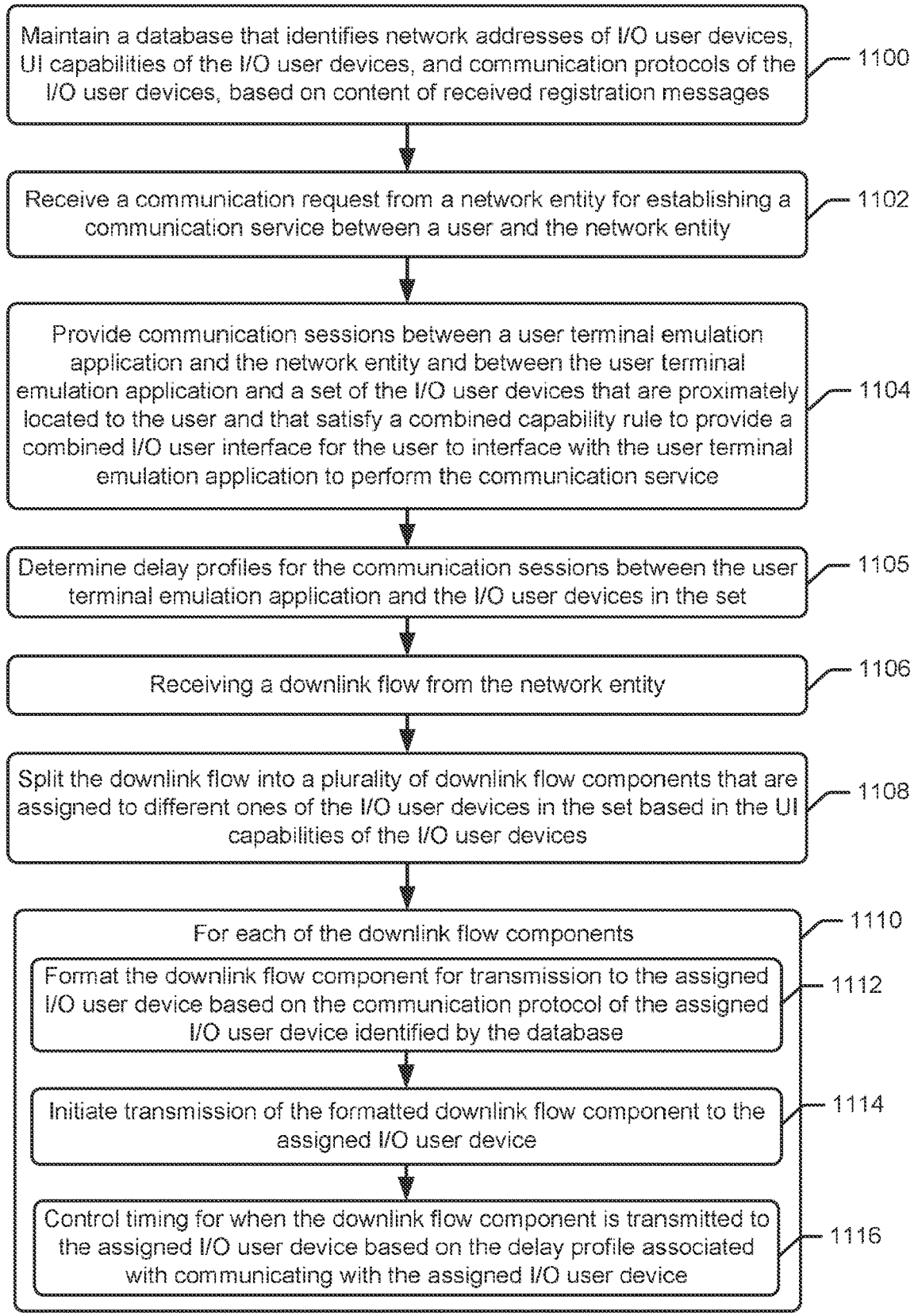
FIGS. 11 and 13 are flowcharts of downlink flow operations that may be performed by a user terminal emulation server to provide communication services through a set of I/O user devices in accordance with some embodiments of the present disclosure.

FIG. 9 is a block diagram of downlink flow functional components of the user terminal emulation server 100 that are configured to operate in accordance with some embodiments of the present disclosure. FIG. 11 is a flowchart of downlink flow operations that may be performed by the user terminal emulation server 100 to provide communication services through a set of I/O user devices in accordance with some embodiments of the present disclosure.

Referring to FIGS. 9 and 11, the downlink flow functional components of the user terminal emulation server 100 are configured to split a downlink flow from the network entity 150 into a plurality of flow components that are formatted for communication to respective I/O user devices having the I/O user interface capabilities that will operate to convey content of the flow components (e.g., display, generate audio output, cause tactile feedback, etc.) to a user during a communication service. The functional components also control timing for when the downlink flow components are transmitted to each of the I/O user devices based on a delay profile that has been determined for communications with the I/O user device.

The user terminal emulation server 100 may synchronize transmissions of the downlink flow components so that the I/O user devices receive them substantially concurrently. For example, a first downlink flow component having a delay profile indicating it will be transmitted through a faster first communication link to a first I/O user device may be delayed so that the first downlink flow component will be received substantially concurrently with a second downlink flow component having a delay profile indicating it is transmitted through a slower second communication link to a second I/O user device.

Alternatively, the user terminal emulation server 100 may control timing for when individual downlink flow components are transmitted to individual I/O user devices based on processing delays introduced by the individual I/O user devices, so that the I/O user devices generate outputs to the user at substantially the same time. For example, assume a first I/O user device has a delay profile indicating less processing delay than a second I/O user device between receipt of a downlink flow component to corresponding output of content to a user. The emulation server 100 can delay transmission of a first downlink flow component to the first I/O user device relative to transmission of a second downlink flow component to the second I/O user device so that the first and second I/O user devices each generate output to the user at substantially the same time.

In the context of the particular examples of FIGS. 9 and 11, the emulation server 100 maintains 1100 a database 120 (FIG. 15) that identifies network addresses of I/O user devices, UI capabilities of the I/O user devices, and communication protocols of the I/O user devices, based on content of registration messages which can be received from a user, the I/O user devices, or another network component. The emulation server 100 receives 1102 a communication request from the network entity 150 for establishing a communication service between a user and the network entity. The emulation server 100 responds to the communication request by performing operations to provide 1104 communication sessions between a user terminal emulation application 110 (FIG. 1) and the network entity 150 and between the user terminal emulation application 110 (FIG. 1) and a set of the I/O user devices ("First I/O user device 130a") and ("Second I/O user device 130b") that are determined to be proximately located to a location of the user and that satisfy a combined capability rule for being combinable to provide a combined I/O user interface for the user to interface with the user terminal emulation application 110 (FIG. 1) to perform the communication service.

The emulation server 100 determines 1105 delay profiles for the communication sessions between the user terminal emulation application 110 (FIG. 1) and the I/O user devices in the set (130a and 130b). Each of the delay profiles indicates a communication delay associated with communicating with a different one of the I/O user devices in the set (130a and 130b). As used herein, for each of the I/O user devices in the set the associated delay profile may characterize any one or more of the following: 1) elapsed time between initiating transmission of a packet of a downlink flow component from the emulation server 100 until the I/O user device completes receipt of the packet; 2) amount of communication jitter as a variation in communication delays occurring over time in communications from the emulation server 100 to the I/O user device; and 3) processing delay between receipt of a packet and output of content to a user through a UI capability of the I/O user device. The delay profiles may be directly measured by the emulation server 100, determined based on reports from the I/O user devices and/or another system component, and/or may be determined based on identifiers of the I/O user devices.

The emulation server 100 receives 1106 a downlink flow 940 from the network entity 150. A downlink flow receiver and component splitter 900 splits the downlink flow 940 into a plurality of downlink flow components that are assigned to different ones of the I/O user devices in the set. The different ones of the downlink flow components in the set have different UI characteristic that match the UI capabilities identified by the database 120 (FIG. 15) for the different ones of the I/O user devices in the set. In the example of FIG. 9, the splitter 900 splits the downlink flow 940 into first and second downlink flow components 942a and 942b.

Figure 15:
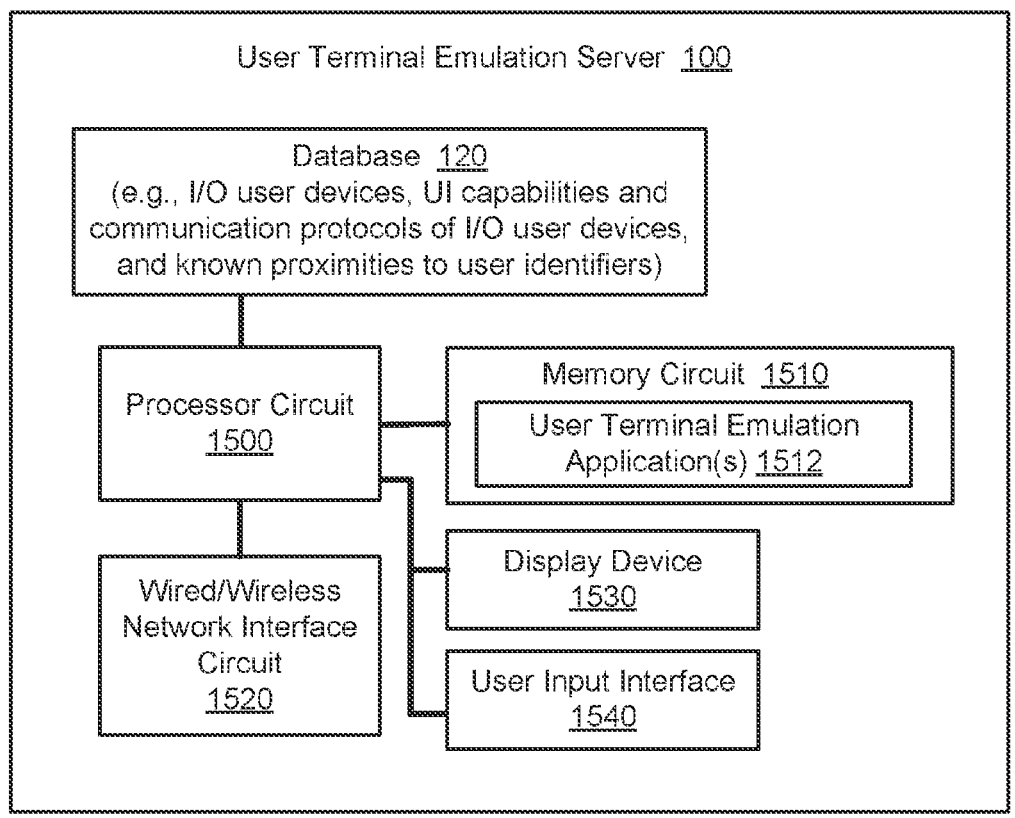
FIG. 15 is a block diagram of hardware circuit components of a user terminal emulation server that are configured to operate in accordance with some embodiments of the present disclosure.

A streaming protocol transmission formatter 910a formats 1112 the first downlink flow component 942a for transmission to the first I/O user device 130a based on the communication protocol of the first I/O user device 130a identified by the database 120 (FIG. 15). In the example of FIG. 9, the formatter 910a formats the first downlink flow component 942a to generate RTP flow 946a and RTCP flow 947a which are provided to a transmission timing controller 912a. The transmission timing controller 912a controls 1116 timing for when the formatted downlink flow component (e.g., RTP flow 946a and RTCP flow 947a) are transmitted to the first I/O user device 130a based on the delay profile associated with communicating with the first I/O user device 130a. The emulation server 100 initiates 1114 transmission of the formatted downlink flow component to the first I/O user device 130a at a time event controlled by the transmission timing controller 912a relative to time indicated by the common time clock such as one provided by a network time protocol (NTP) module 930.

Similar operations are performed in parallel on the second downlink flow component 942b. A streaming protocol transmission formatter 910b formats 1112 the second downlink flow component 942b for transmission to the second I/O user device 130b based on the communication protocol of the second I/O user device 130b identified by the database 120 (FIG. 15). The formatter 910b formats the second downlink flow component 942b to generate Real-time Transport Protocol (RTP) flow 946b and Real-time Control Transport Protocol (RTCP) flow 947b which are provided to a transmission timing controller 912b. The transmission timing controller 912b controls 1116 timing for when the formatted downlink flow component (e.g., RTP flow 946b and RTCP flow 947b) are transmitted to the second I/O user device 130b based on the delay profile associated with communicating with the second I/O user device 130b. The emulation server 100 initiates 1114 transmission of the formatted downlink flow component to the second I/O user device 130b at a time event controlled by the transmission timing controller 912b relative to time indicated by the NTP module 930.

The operations by the formatters 910a and 910b to format 1112 the first and second downlink flow components 942a and 942b for transmission to the respective first and second I/O user devices 130a and 130b based on their respective communication protocols identified by the database 120 (FIG. 15), can include adding a timestamp (e.g., to a flow packet header), based on a common time clock such as from the NTP module 930, to each of the downlink flow components.

The operations by the transmission timing controller is 912a and 912b to control 1116 timing for when the respective formatted downlink flow components are transmitted to the respective first and second I/O user devices 130a and 130b, can include controlling the timing so the RTP formatted downlink flow components 946a and 946b are substantially time aligned when transmitted as RTP flows 948a and 948b.

For example, the operations to control 1116 timing for when the formatted downlink flow components (e.g., RTP flow) are transmitted can include comparing the delay profiles associated with communicating with the first and second I/O user devices 130a and 130b, and controlling, based on the comparison of the delay profiles, timing offsets between when individual ones of the downlink flow components are transmitted so the downlink flow components are received at substantially the same time by the first and second I/O user devices 130a and 130b.

As explained above, each of the delay profiles may be determined based on communication jitter associated with communicating with a different one of the I/O user devices in the set, i.e., first and second I/O user devices 130a and 130b, where the communication jitter is determined based on variations in the communication delays that are measured over time for communications from the emulation server 100 to the one of the I/O user devices in the set.

Figure 13:
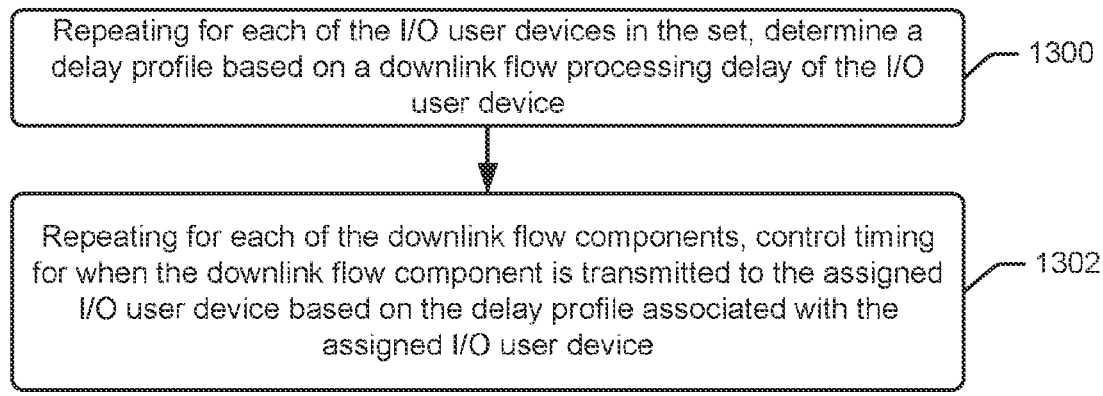

Referring to the flowchart of FIG. 13, the emulation server 100 may repeat for each of the I/O user devices in the set and operation to determine 1300 a delay profile based on a downlink flow processing delay of the I/O user device, where the downlink flow processing delay is based on a time delay between the I/O user device receiving a downlink flow component to outputting a result from processing of at least a portion of the downlink flow component. For each of the downlink flow components, the emulation server 100 may repeat operations to control 1302 timing for when the downlink flow component is transmitted to the assigned I/O user device based on the delay profile associated with the assigned I/O user device.

The operation to determine 1300 the delay profile based on the downlink flow processing delay of the I/O user device, can include repeating for each of the I/O user devices in the set a determination of a time delay between initiating transmission of a response request to the I/O user device and receiving a response from the I/O user device through at least one of the communication session and an earlier communication session. Thus, the time delay may be determined for a current ongoing communication session and/or may be determined based on one or more earlier communication sessions that have since been terminated.

The operation to determine 1105 delay profiles for the communication sessions between the user terminal emulation application and the I/O user devices in the set, can include repeating for each of the I/O user devices in the set, controlling a rate at which the delay profile for the communication session between the user terminal emulation application and the I/O user device is updated based on at least one of: rate of change of the communication delay; quality of service of the communication session between the user terminal emulation application and the I/O user device; and type of radio technology that is used to perform communications between the user terminal emulation application and the I/O user device. In this manner, the emulation server 100 can more rapidly update the delay profile for a particular I/O user device that has a fast changing communication link with the emulation server 100, while avoiding unnecessary processing overhead that would otherwise result if other delay profiles for other I/O user devices having more stable communication links were updated more frequently than needed to track changes with those particular communication links.

Illustrative Operations for Speaker and Display Devices

Various further operations that can be performed by the user terminal emulation server 100 are now described with regard to FIG. 11 in the context of speaker devices and display devices, although these operations are not limited thereto or may be used with other types of I/O user devices.

For these operations, a speaker device is one of the I/O user devices in the set that is capable of playing an audio stream contained in the downlink flow, and a display device is another one of the I/O user devices in the set that is capable of displaying a video stream contained in the downlink flow. The operation to split 1108 the downlink flow into a plurality of downlink flow components that are assigned to different ones of the I/O user devices in the set, can include generating a first downlink flow component that contains the audio stream and does not contain the video stream, and generating a second downlink flow component that contains the video stream and does not contain the audio stream.

The operation to format 1112 the downlink flow components for transmission, can include formatting the first downlink flow component containing the audio stream for transmission to the speaker device based on the communication protocol of the speaker device identified by the database, and formatting the second downlink flow component containing the video stream for transmission to the display device based on the communication protocol of the display device identified by the database.

The operation to initiate 1114 transmission of the formatted components to the assigned I/O user devices in the set, can include initiating transmission of the formatted first downlink flow component to the speaker device according to the communication protocol identified by the database for the speaker device, and initiating transmission of the formatted second downlink flow component to the display device according to the communication protocol identified by the database for the display device.

The operation to determine 1105 a delay profile can include determining a delay profile for the speaker device. The operation to determine 1105 a delay profile can further include determining a delay profile for the display device. The operation to control 1116 timing can include controlling timing for when the formatted first downlink flow component is transmitted to the speaker device and for when the formatted second downlink flow component is transmitted to the display device based on comparison of the delay profiles for the speaker and display devices.

The delay profile for the speaker device may be determined based on measurement of delay in receipt by the speaker device of communications from the user terminal emulation server. The delay profile for the display device may be determined based on measurement of delay in receipt by the display device of communications from the user terminal emulation server. The operation to control timing may include controlling when the formatted first downlink flow component is transmitted to the speaker device relative to when the formatted second downlink flow component is transmitted to the display device so the formatted first downlink flow component is received by the speaker device at substantially the same time that the formatted second downlink flow component is received by the display device.

Alternatively or additionally, the delay profile for the speaker device may be determined based on measurement of processing delay between the speaker device receiving a downlink flow component and completing processing to output an audio signal. The delay profile for the display device may be determined based on measurement of processing delay between the display device receiving a downlink flow component and completing processing to display content. The operation to control timing may include controlling when the formatted first downlink flow component is transmitted to the speaker device relative to when the formatted second downlink flow component is transmitted to the display device so the speaker device completes processing of the formatted first downlink flow component at substantially the same time that the display device completes processing of the formatted second downlink flow component.

Further Operations for Controlling Uplink Flow Timing and Formatting

Figure 10:
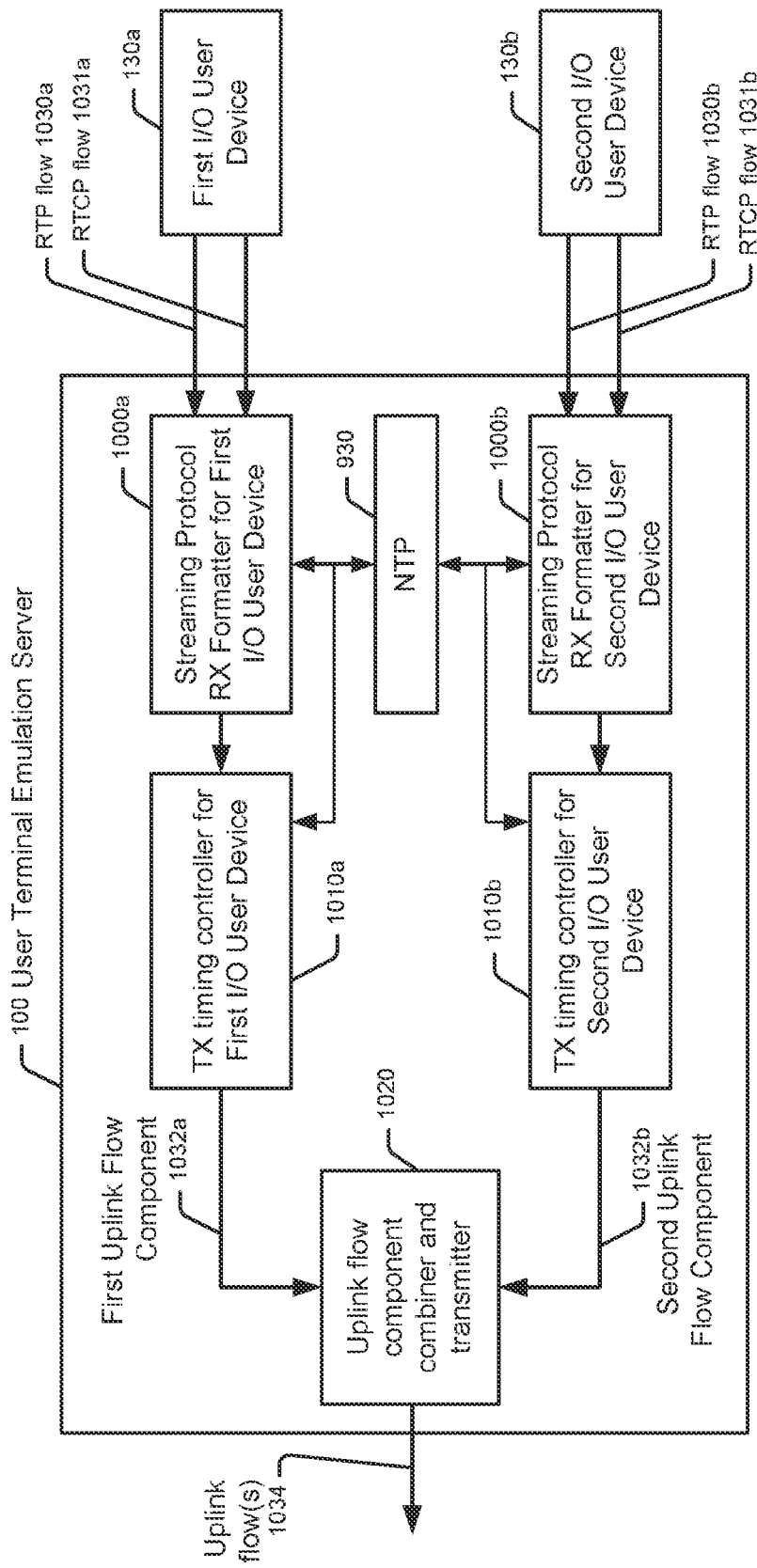
FIG. 10 is a block diagram of uplink flow functional components of a user terminal emulation server that are configured to operate in accordance with some embodiments of the present disclosure.
Figure 12:
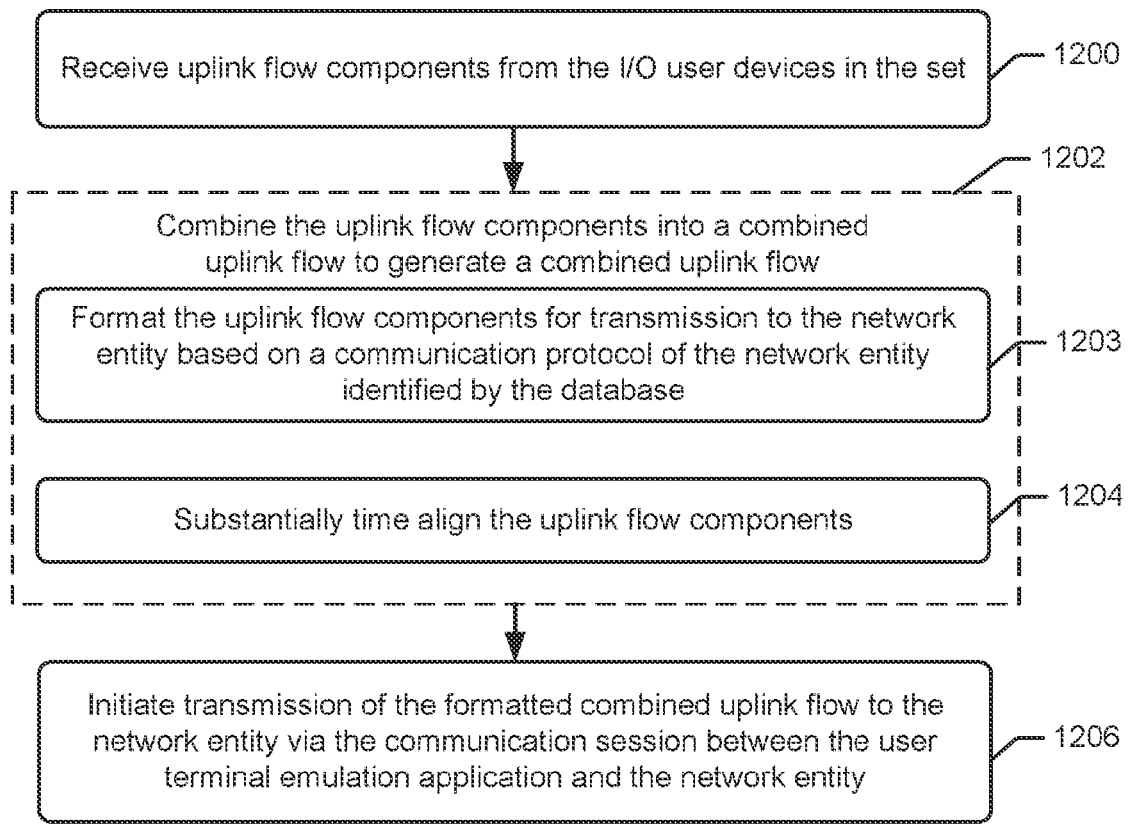
FIG. 12 is a flowchart of uplink flow operations that may be performed by a user terminal emulation server to provide communication services through a set of I/O user devices in accordance with some embodiments of the present disclosure.

FIG. 10 is a block diagram of uplink flow functional components of the user terminal emulation server 100 that are configured to operate in accordance with some embodiments of the present disclosure. FIG. 12 is a flowchart of uplink flow operations that may be performed by the user terminal emulation server 100 to provide communication services through a set of I/O user devices in accordance with some embodiments of the present disclosure.

Referring to FIGS. 10 and 12, the uplink flow functional components of the user terminal emulation server 100 are configured to receive 1200 uplink flow components from the I/O user devices in the set. The uplink flow functional components combined 1202 the uplink flow components into a combined uplink flow, including by formatting 1203 the uplink flow components for transmission to the network entity based on a communication protocol of the network entity identified by the database. The uplink flow functional components then initiate 1206 transmission of the combined uplink flow 1034 to the network entity via the communication session between the user terminal emulation application and the network entity.

The operation to combine 1202 the uplink flow components into the combined uplink flow, can include substantially time aligning 1204 the uplink flow components based on a common time clock when combining into the combined uplink flow. Alternatively or additionally, the operation to combine 1202 the uplink flow components into the combined uplink flow, can include substantially time aligning 1204 the uplink flow components when combining into the combined uplink flow based on delay profiles for the communication sessions between the user terminal emulation application and the I/O user devices in the set from which the uplink flow components were received.

In the context of the particular example of FIG. 10, a streaming protocol receiver formatter 1000*a* can receive and uplink flow component, e.g. a pair of RTP and RTCP flows 1030*a* and 1031*a*, from the first I/O user device 130*a*. Similarly, another streaming protocol receiver formatter 1000*b* can receive another uplink flow component, e.g. a pair of RTP and RTCP flows 1030*b* and 1031*b*, from the second I/O user device 130*b*. The pair of receiver formatters 1000*a* and 1000*b* can format the uplink flow components for transmission to the network entity 150 based on communication protocol of the network entity that is identified by the database 120 (FIG. 15). A pair of TX timing controllers 1010*a* and 1010*b* use the common time clock provided by the NTP module 932 substantially time align the uplink flow components 1032*a* and 1032*b*. A combiner and transmitter 1020 combines the uplink flow components 1032*a* and 1032*b* to generate a combined uplink flow 1034, and transmits the combined uplink flow 1034 to the network entity 150.

Example I/O User Device and User Terminal Emulation Server

Figure 14:
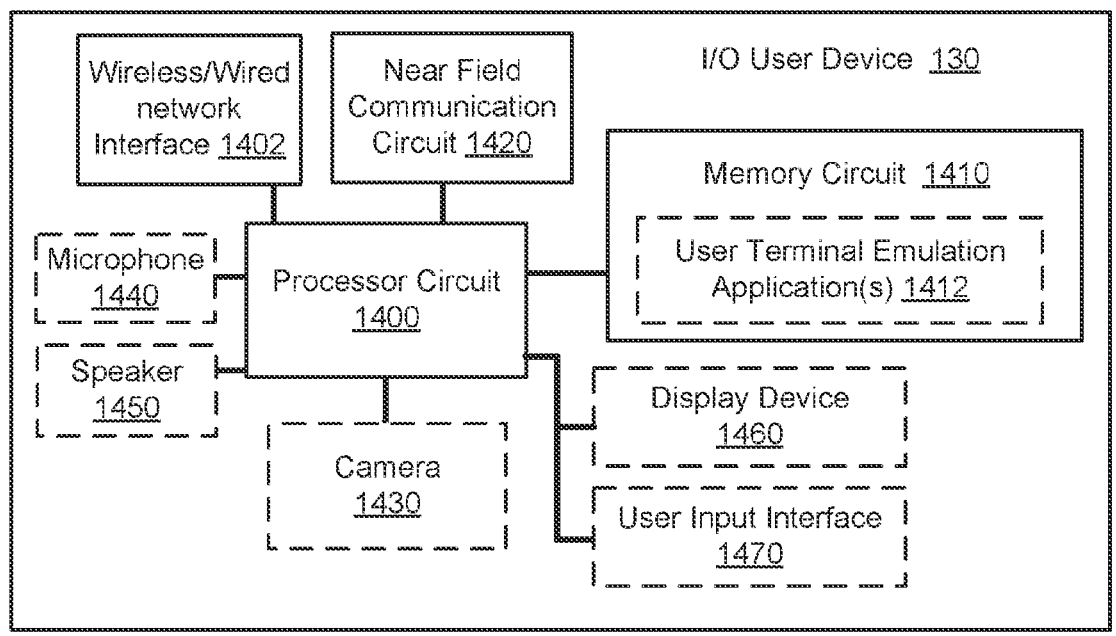
FIG. 14 is a block diagram of hardware circuit components of an I/O user device which are configured to operate in accordance with some embodiments.

FIG. 14 is a block diagram of hardware circuit components of an I/O user device 130 which are configured to operate in accordance with some embodiments. The I/O user device 130 can include a wired/wireless network interface circuit 1402, a near field communication circuit 1420, at least one processor circuit 1400 (processor), and at least one memory circuit 1410 (memory). The processor 1400 is connected to communicate with the other components. The memory 1410 stores program code (e.g., user terminal emulation application(s)) 1412 that is executed by the processor 1400 to perform operations disclosed herein. The processor 1400 may include one or more data processing circuits (e.g., microprocessor and/or digital signal processor), which may be collocated or distributed across one or more data networks. The processor 1400 is configured to execute the program code 1412 in the memory 1410, described below as a non-transitory computer readable medium, to perform some or all of the operations and methods for one or more of the embodiments disclosed herein for a mobile electronic device. The I/O user device 130 can include one or more UI component devices, including without limitation, a microphone 1440, a speaker 1450, a camera 1430, and display device 1460, and a user input interface 1470.

FIG. 15 is a block diagram of hardware circuit components of a user terminal emulation server 100 which are configured to operate in accordance with some embodiments. The user terminal emulation server 100 can include a wired/wireless network interface circuit 1520, a database 120 (e.g., listing I/O user devices, UI capabilities of the I/O user devices, communication protocols used to communicate with the I/O user devices, known proximities to user identifiers, etc.), a display device 1530, a user input interface 1540 (e.g., keyboard or touch sensitive display), at least one processor circuit 1500 (processor), and at least one memory circuit 1510 (memory). The processor 1500 is connected to communicate with the other components. The memory 1510 stores user terminal emulation application 1512 that is executed by the processor 1500 to perform operations disclosed herein. The processor 1500 may include one or more data processing circuits (e.g., microprocessor and/or digital signal processor), which may be collocated or distributed across one or more data networks. The processor 1500 is configured to execute computer program instructions in the memory 1510, described below as a non-transitory computer readable medium, to perform some or all of the operations and methods for one or more of the embodiments disclosed herein for a mobile electronic device.

Cloud Implementation

Some or all operations described above as being performed by the user terminal emulation server 100 or the I/O user devices 130 may alternatively be performed by the other one, and/or by another node that is part of a cloud computing resource. For example, those operations can be performed as a network function that is close to the edge, such as in a cloud server or a cloud resource of a telecommunications network operator, e.g., in a CloudRAN or a core network, and/or may be performed by a cloud server or a cloud resource of a media provider, e.g., iTunes service provider or Spotify service provider.

Abbreviations

3GPP 3rd Generation Partnership Project'
App Application, i.e. program
eNB Evolved Node B (a.k.a. RBS, Radio Base Station)
GW Gateway (also. acronym for Leif GW Persson)
ICMP Internet Control Message Protocol
IOD Input-Output Device
ITU International Telecommunication Union
RTP Real Time Protocol
RTCP Real Time Control Protocol
IOD Input Output Device
IODH Input Output Device Handler
NTP Network Time Protocol
SDP Session Description Protocol
SR Sender Response
UE User equipment Further Definitions and Embodiments In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A user terminal emulation server for providing communication services using sets of input and/or output, I/O, user devices, the user terminal emulation server comprising:
processing circuitry; and
memory storing instructions that when executed by the processing circuitry cause the user terminal emulation server to perform operations comprising:
maintaining a database that identifies network addresses of I/O user devices, user interface, UI, capabilities of the I/O user devices, and communication protocols of the I/O user devices, based on content of received registration messages;
receiving a communication request from a network entity for establishing a communication service between a user and the network entity; and
responsive to the communication request, performing:
providing communication sessions between a user terminal emulation application and the network entity and between the user terminal emulation application and a set of the I/O user devices that are determined to be proximately located to a location of the user and that satisfy a combined capability rule for being combinable to provide a combined I/O user interface for the user to interface with the user terminal emulation application to perform the communication service;

determining delay profiles for the communication sessions between the user terminal emulation application and the I/O user devices in the set, wherein each of the delay profiles indicates a communication delay associated with communicating with a different one of the I/O user devices in the set;

receiving a downlink flow from the network entity;

splitting the downlink flow into a plurality of downlink flow components that are assigned to different ones of the I/O user devices in the set, the different ones of the downlink flow components in the set having different UI characteristic that match the UI capabilities identified by the database for the different ones of the I/O user devices in the set; and repeating for each of the downlink flow components,
formatting the downlink flow component for transmission to the assigned I/O user device based on the communication protocol of the assigned I/O user device identified by the database,
initiating transmission of the formatted downlink flow component to the assigned I/O user device; and
controlling timing for when the formatted downlink flow component is transmitted to the assigned I/O user device based on the delay profile associated with communicating with the assigned I/O user device.

2. The user terminal emulation server of claim 1, wherein the operation to format the downlink flow component for transmission to the assigned I/O user device based on the communication protocol of the assigned I/O user device identified by the database, comprises:
adding a timestamp, based on a common time clock, to each of the downlink flow components.

3. The user terminal emulation server of claim 2, wherein the operations further comprise updating the common time clock based on a Network Time Protocol, NTP.

4. The user terminal emulation server of claim 1, wherein:
repeating for each of the downlink flow components,
the operation to format the downlink flow component comprises generating a Real-time Transport Protocol, RTP, formatted downlink flow component and a Real-time Control Transport Protocol, RTCP, formatted downlink flow component,
the operation to control timing for when the formatted downlink flow component is transmitted to the assigned I/O user device based on the delay profile associated with communicating with the assigned I/O user device, comprises controlling the timing so the RTP formatted downlink flow components for the assigned I/O user devices in the set are substantially time aligned based on a common time clock; and
the operation to initiate transmission of the formatted component operates to initiate transmissions of the RTP formatted downlink flow component to the assigned I/O user device.

5. The user terminal emulation server of claim 1, wherein the operations further comprise:
receiving uplink flow components from the I/O user devices in the set;
combining the uplink flow components into a combined uplink flow, including by formatting the uplink flow components for transmission to the network entity based on a communication protocol of the network entity identified by the database; and
initiating transmission of the combined uplink flow to the network entity via the communication session between the user terminal emulation application and the network entity.

6. The user terminal emulation server of claim 5, wherein the operation to combine the uplink flow components into the combined uplink flow, comprises:
substantially time aligning the uplink flow components based on a common time clock when combining into the combined uplink flow.

7. The user terminal emulation server of claim 5, wherein the operation to combine the uplink flow components into the combined uplink flow, comprises:
substantially time aligning the uplink flow components when combining into the combined uplink flow based on delay profiles for the communication sessions between the user terminal emulation application and the I/O user devices in the set from which the uplink flow components were received.

8. The user terminal emulation server of claim 1, wherein the operation to control timing for when the formatted downlink flow component is transmitted to the assigned I/O user device based on the delay profile associated with communicating with the assigned I/O user device, comprises:
comparing the delay profiles associated with communicating with the assigned I/O user devices to which the formatted downlink flow components are to be transmitted; and
controlling, based on the comparison of the delay profiles, timing offsets between when individual ones of the downlink flow components are transmitted so the downlink flow components are received at substantially the same time by the I/O user devices in the set.

9. The user terminal emulation server of claim 1, wherein:
each of the delay profiles is determined based on communication jitter associated with communicating with a different one of the I/O user devices in the set, the communication jitter being determined based on variations in the communication delays that are measured over time for communications from the user terminal emulation server to the one of the I/O user devices in the set.

10. The user terminal emulation server of claim 1, wherein the operations further comprise:
repeating for each of the I/O user devices in the set, determining a delay profile based on a downlink flow processing delay of the I/O user device, the downlink flow processing delay is based on a time delay between the I/O user device receiving a downlink flow component to outputting a result from processing of at least a portion of the downlink flow component; and
repeating for each of the downlink flow components, controlling timing for when the downlink flow component is transmitted to the assigned I/O user device based on the delay profile associated with the assigned I/O user device.

11. The user terminal emulation server of claim 10, wherein the operations, repeating for each of the I/O user devices in the set, to determine the delay profile based on the downlink flow processing delay of the I/O user device, comprise:
repeating for each of the I/O user devices in the set, determining a time delay between initiating transmission of a response request to the I/O user device and receiving a response from the I/O user device through at least one of the communication sessions and an earlier communication session.

12. The user terminal emulation server of claim 1, wherein the operation to determine delay profiles for the communication sessions between the user terminal emulation application and the I/O user devices in the set, comprises:
repeating for each of the I/O user devices in the set, controlling a rate at which the delay profile for the communication session between the user terminal emulation application and the I/O user device is updated based on at least one of: rate of change of the communication delay; quality of service of the communication session between the user terminal emulation application and the I/O user device; and type of radio technology that is used to perform communications between the user terminal emulation application and the I/O user device.

13. The user terminal emulation server of claim 1, wherein:
a speaker device is one of the I/O user devices in the set capable of playing an audio stream contained in the downlink flow;
a display device is one of the I/O user devices in the set capable of displaying a video stream contained in the downlink flow;
the operation to split the downlink flow into a plurality of downlink flow components that are assigned to different ones of the I/O user devices in the set, comprises:
generating a first downlink flow component that contains the audio stream and does not contain the video stream; and
generating a second downlink flow component that contains the video stream and does not contain the audio stream;
the operation to format the downlink flow components for transmission, comprise:
formatting the first downlink flow component containing the audio stream for transmission to the speaker device based on the communication protocol of the speaker device identified by the database; and
formatting the second downlink flow component containing the video stream for transmission to the display device based on the communication protocol of the display device identified by the database, and
the operation to initiate transmission of the formatted components to the assigned I/O user devices in the set, comprises:
initiating transmission of the formatted first downlink flow component to the speaker device according to the communication protocol identified by the database for the speaker device; and
initiating transmission of the formatted second downlink flow component to the display device according to the communication protocol identified by the database for the display device.

14. The user terminal emulation server of claim 13, wherein:
the operation to determine a delay profile comprises determining a delay profile for the speaker device;
the operation to determine a delay profile further comprises determining a delay profile for the display device; and
the operation to control timing comprises controlling timing for when the formatted first downlink flow component is transmitted to the speaker device and for when the formatted second downlink flow component is transmitted to the display device based on comparison of the delay profiles for the speaker and display devices.

15. The user terminal emulation server of claim 14, wherein:
the delay profile for the speaker device is determined based on measurement of delay in receipt by the speaker device of communications from the user terminal emulation server;
the delay profile for the display device is determined based on measurement of delay in receipt by the display device of communications from the user terminal emulation server; and
the operation to control timing comprises controlling when the formatted first downlink flow component is transmitted to the speaker device relative to when the formatted second downlink flow component is transmitted to the display device so the formatted first downlink flow component is received by the speaker device at substantially the same time that the formatted second downlink flow component is received by the display device.

16. The user terminal emulation server of claim 14, wherein:
the delay profile for the speaker device is determined based on measurement of processing delay between the speaker device receiving a downlink flow component and completing processing to output an audio signal;
the delay profile for the display device is determined based on measurement of processing delay between the display device receiving a downlink flow component and completing processing to display content;
the operation to control timing comprises controlling when the formatted first downlink flow component is transmitted to the speaker device relative to when the formatted second downlink flow component is transmitted to the display device so the speaker device completes processing of the formatted first downlink flow component at substantially the same time that the display device completes processing of the formatted second downlink flow component.

17. A method by a user terminal emulation server for providing communication services using sets of input and/or output, I/O, user devices, the method comprising:
maintaining a database that identifies network addresses of I/O user devices, user interface, UI, capabilities of the I/O user devices, and communication protocols of the I/O user devices, based on content of received registration messages;
receiving a communication request from a network entity for establishing a communication service between a user and the network entity; and
responsive to the communication request, performing:
providing communication sessions between a user terminal emulation application and the network entity and between the user terminal emulation application and a set of the I/O user devices that are determined to be proximately located to a location of the user and that satisfy a combined capability rule for being combinable to provide a combined I/O user interface for the user to interface with the user terminal emulation application to perform the communication service;
determining delay profiles for the communication sessions between the user terminal emulation application and the I/O user devices in the set, wherein each of the delay profiles indicates a communication delay associated with communicating with a different one of the I/O user devices in the set;

receiving a downlink flow from the network entity;

splitting the downlink flow into a plurality of downlink flow components that are assigned to different ones of the I/O user devices in the set, the different ones of the downlink flow components in the set having different UI characteristic that match the UI capabilities identified by the database for the different ones of the I/O user devices in the set;

repeating for each of the downlink flow components,
formatting the downlink flow component for transmission to the assigned I/O user device based on the communication protocol of the assigned I/O user device identified by the database, and
initiating transmission of the formatted downlink flow component to the assigned I/O user device; and
controlling timing for when the formatted downlink flow component is transmitted to the assigned I/O user device based on the delay profile associated with communicating with the assigned I/O user device.

18. The method of claim 17, further comprising: repeating for each of the downlink flow components,
the operation to format the downlink flow component comprises generating a Real-time Transport Protocol, RTP, formatted downlink flow component and a Real-time Control Transport Protocol, RTCP, formatted downlink flow component,
the operation to control timing for when the formatted downlink flow component is transmitted to the assigned I/O user device based on the delay profile associated with communicating with the assigned I/O user device, comprises controlling the timing so the RTP formatted downlink flow components for the assigned I/O user devices in the set are substantially time aligned based on a common time clock; and
the operation to initiate transmission of the formatted component operates to initiate transmissions of the RTP formatted downlink flow component to the assigned I/O user device.

19. A computer program product comprising a non-transitory computer readable medium storing program code that is executed by at least one processor of a user terminal emulation server for providing communication services using sets of input and/or output, I/O, user devices, the program code when executed by the at least one processor performing operations comprising:
maintaining a database that identifies network addresses of I/O user devices, user interface, UI, capabilities of the I/O user devices, and communication protocols of the I/O user devices, based on content of received registration messages;

receiving a communication request from a network entity for establishing a communication service between a user and the network entity; and responsive to the communication request, performing:
providing communication sessions between a user terminal emulation application and the network entity and between the user terminal emulation application and a set of the I/O user devices that are determined to be proximately located to a location of the user and that satisfy a combined capability rule for being combinable to provide a combined I/O user interface for the user to interface with the user terminal emulation application to perform the communication service;
determining delay profiles for the communication sessions between the user terminal emulation application and the I/O user devices in the set, wherein each of the delay profiles indicates a communication delay associated with communicating with a different one of the I/O user devices in the set;
receiving a downlink flow from the network entity;
splitting the downlink flow into a plurality of downlink flow components that are assigned to different ones of the I/O user devices in the set, the different ones of the downlink flow components in the set having different UI characteristic that match the UI capabilities identified by the database for the different ones of the I/O user devices in the set; and
repeating for each of the downlink flow components,
formatting the downlink flow component for transmission to the assigned I/O user device based on the communication protocol of the assigned I/O user device identified by the database,
initiating transmission of the formatted downlink flow component to the assigned I/O user device; and
controlling timing for when the formatted downlink flow component is transmitted to the assigned I/O user device based on the delay profile associated with communicating with the assigned I/O user device.

20. The computer program product of claim 19, wherein the program code when executed by the at least one processor further performing the operations of:
receiving uplink flow components from the I/O user devices in the set;
combining the uplink flow components into a combined uplink flow, including by formatting the uplink flow components for transmission to the network entity based on a communication protocol of the network entity identified by the database; and
initiating transmission of the combined uplink flow to the network entity via the communication session between the user terminal emulation application and the network entity.

* * * * *